US012631003B2

(12) United States Patent
Imanaga

(10) Patent No.: US 12,631,003 B2
(45) Date of Patent: May 19, 2026

(54) WORKING VEHICLE

(71) Applicant: KUBOTA CORPORATION, Osaka (JP)

(72) Inventor: Yuji Imanaga, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/103,923

(22) PCT Filed: Jul. 28, 2023

(86) PCT No.: PCT/JP2023/027772
§ 371 (c)(1),
(2) Date: Feb. 14, 2025

(87) PCT Pub. No.: WO2024/043002
PCT Pub. Date: Feb. 29, 2024

(65) Prior Publication Data
US 2025/0376828 A1 Dec. 11, 2025

(30) Foreign Application Priority Data

Aug. 23, 2022 (JP) ................................. 2022-132624

(51) Int. Cl.
*E02F 9/20* (2006.01)
*E02F 9/16* (2006.01)
*F16C 1/12* (2006.01)
(52) U.S. Cl.
CPC ............ *E02F 9/2004* (2013.01); *E02F 9/166* (2013.01); *F16C 1/12* (2013.01); *F16C 2350/26* (2013.01)
(58) Field of Classification Search
CPC ........... E02F 9/2004; E02F 9/166; F16C 1/12; F16C 2350/26
See application file for complete search history.

(56) References Cited

U.S. PATENT DOCUMENTS

| | | | |
|---|---|---|---|
| 5,877,936 A | 3/1999 | Nishitani et al. | |
| 6,450,278 B1 * | 9/2002 | Shirogami ............ | E02F 9/2004 180/89.18 |

(Continued)

FOREIGN PATENT DOCUMENTS

| | | |
|---|---|---|
| JP | 56-170037 | 12/1981 |
| JP | 59-170027 | 11/1984 |

(Continued)

OTHER PUBLICATIONS

Written Opinion with International Search Report, dated Sep. 19, 2023, issued in International Bureau of WIPO Patent Application No. PCT/JP2023/027772 with English langauge translation thereof.

*Primary Examiner* — Jason D Shanske
*Assistant Examiner* — Matthew James O'Neill
(74) *Attorney, Agent, or Firm* — GREENBLUM & BERNSTEIN, P.L.C.

(57) ABSTRACT

Provided is a working vehicle capable of suitably guiding a longitudinal member. A movable loader lever, cables and that are formed in a flexible longitudinal shape, are coupled to the loader lever, and move with movement of the loader lever, and a movable member that includes an insertion hole through which the cables and are inserted and that is provided to be relatively movable with respect to a vehicle body are included, a plate-shaped member that is fixed to the vehicle body and includes a cutout portion is further included, and the movable member is provided to be relatively movable with respect to the plate-shaped member such that the insertion hole moves within a range inside the cutout portion.

15 Claims, 20 Drawing Sheets

(56) References Cited

U.S. PATENT DOCUMENTS

| | | | | |
|---|---|---|---|---|
| 9,206,585 | B2 * | 12/2015 | Kurushima | ............... E02F 9/16 |
| 9,745,719 | B1 | 8/2017 | Boyce et al. | |
| 2017/0247859 | A1 * | 8/2017 | Boyce | ................... E02F 9/2004 |

FOREIGN PATENT DOCUMENTS

| | | | |
|---|---|---|---|
| JP | 9-188161 | A | 7/1997 |
| JP | 10-76887 | A | 3/1998 |
| JP | 10-292433 | | 11/1998 |
| JP | 2001-128348 | A | 5/2001 |

* cited by examiner

Fig. 3

WORKING VEHICLE

TECHNICAL FIELD

The present invention relates to a technique of a working vehicle.

BACKGROUND ART

Conventionally, a technique of a working vehicle including a longitudinal member such as a cable is known. For example, Patent Literature 1 discloses such a technique.

A working vehicle (tractor) described in Patent Literature 1 includes a movable seat, a joystick device for operating a front loader, a cable for connecting the joystick device and a valve, and the like. The joystick device is fixed to the seat and moves integrally with the seat. The cable is guided from the inside to the outside of a cabin through a long hole formed in a plate. By disposing the cable through the long hole in this manner, it is possible to allow movement and deformation of the cable accompanying movement of the seat.

However, in the technique of Patent Literature 1, it is necessary to form a relatively large long hole in order to allow the movement of the cable. Therefore, there is a possibility that dust flows into the cabin through the long hole, and there is a possibility that the aesthetic appearance is deteriorated. Therefore, there is room for improvement, for example, a large-sized seal member that closes the long hole is separately required.

CITATION LIST

Patent Literature

Patent Literature 1: U.S. Pat. No. 9,745,719

SUMMARY OF INVENTION

Technical Problem

One aspect of the present disclosure has been made in view of the above circumstances, and an object of the present disclosure is to provide a working vehicle capable of suitably guiding the longitudinal member.

Solution to Problem

The problem to be solved by one aspect of the present disclosure is as described above, and means for solving the problem will be described below.

An aspect of the present disclosure includes: a moving member that is movable; a longitudinal member that is formed in a flexible longitudinal shape, is coupled to the moving member, and moves with movement of the moving member; and a movable member that includes an insertion portion through which the longitudinal member is inserted, and that is provided to be relatively movable with respect to a vehicle body.

According to one aspect of the present disclosure, the longitudinal member can be suitably guided.

An aspect of the present disclosure further includes a fixing member fixed to the vehicle body and including a cutout portion, in which the movable member is provided to be relatively movable with respect to the fixing member such that the insertion portion moves within a range inside the cutout portion.

According to one aspect of the present disclosure, it is possible to suppress excessive deformation of a cable disposed so as to penetrate the fixing member.

In one aspect of the present disclosure, the fixing member includes a first plate-shaped portion in which the cutout portion is formed, and the movable member includes a second plate-shaped portion in which the insertion portion is formed and that is formed to close the cutout portion of the first plate-shaped portion.

According to one aspect of the present disclosure, it is possible to prevent distribution of dust and improve aesthetic appearance.

An aspect of the present disclosure further includes a guide mechanism that guides movement of the movable member.

According to one aspect of the present disclosure, the movable member can be suitably moved.

In one aspect of the present disclosure, the guide mechanism includes: a roller rotatably provided on one of the movable member or the fixing member; and a guide portion provided on another of the movable member or the fixing member and that guides the roller.

According to one aspect of the present disclosure, the movable member can be suitably moved.

In one aspect of the present disclosure, the guide mechanism is provided on each of one side surface side and the other side surface side of the first plate-shaped portion.

According to one aspect of the present disclosure, the movable member can be suitably moved.

In one aspect of the present disclosure, the moving member includes an operation tool that operates a front loader, and the longitudinal member includes a cable that transmits an operation of the operation tool.

According to one aspect of the present disclosure, it is possible to suppress excessive deformation of the cable coupled to the operation tool that operates the front loader.

An aspect of the present disclosure further includes a seat provided on a boarding portion on which a worker boards, the seat being adjustable in position, in which the fixing member forms a bottom portion of the boarding portion, and the operation tool is configured to move integrally with the seat.

According to one aspect of the present disclosure, it is possible to suppress excessive deformation of the cable that moves with the position adjustment of the seat.

In one aspect of the present disclosure, the longitudinal member is provided so as to extend from the operation tool in one direction along a movement direction of the seat, and is guided below the bottom portion through the insertion portion and extends in a direction opposite to the one direction below the bottom portion.

According to one aspect of the present disclosure, it is possible to suppress an increase in sliding resistance of the cable due to the movement of the seat.

Advantageous Effects of Invention

According to one aspect of the present disclosure, the longitudinal member can be suitably guided.

BRIEF DESCRIPTION OF DRAWINGS

FIG. 3 is a side view illustrating a loader lever and an operation mechanism.

DESCRIPTION OF EMBODIMENT

Figure 1:
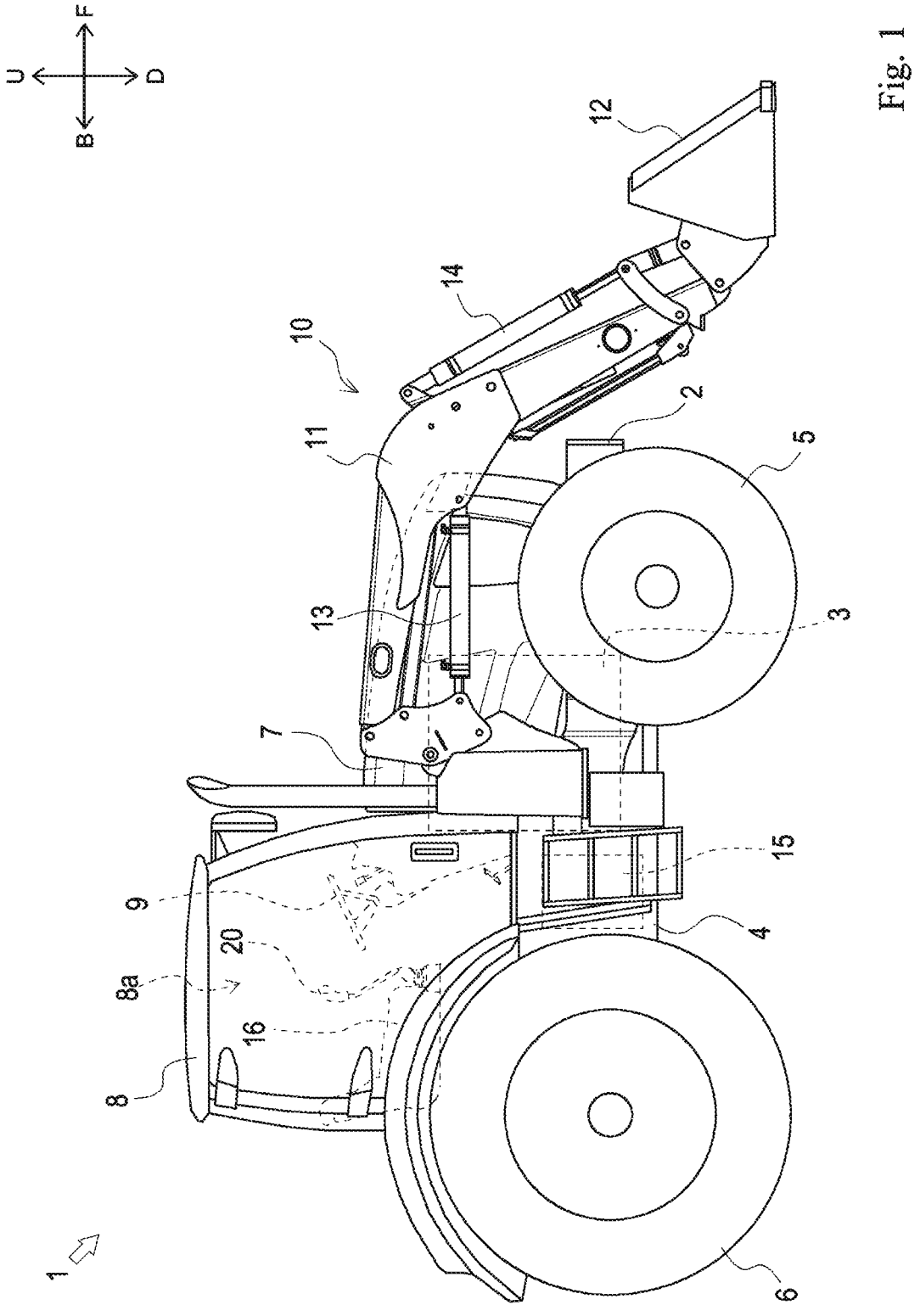
FIG. 1 is a side view illustrating an overall configuration of a tractor according to an embodiment of the present invention.

Hereinafter, directions indicated by arrows U, D, F, B, L, and R in the drawings are defined as an upward direction, a downward direction, a forward direction, a backward direction, a left direction, and a right direction, respectively, with respect to a vehicle body of a tractor 1.

Hereinafter, the tractor 1 according to an embodiment of the disclosure will be described with reference to FIGS. 1 and 2.

The tractor 1 mainly includes a machine body frame 2, an engine 3, a transmission case 4, front wheels 5, rear wheels 6, a bonnet 7, a cabin 8, a steering wheel 9, and a front loader 10.

The machine body frame 2 illustrated in FIG. 1 is a frame-shaped member formed by appropriately combining a plurality of panel members. The machine body frame 2 is formed in a substantially rectangular shape in plan view. The machine body frame 2 is disposed with its longitudinal direction oriented in a front-back direction. The engine 3 is fixed to a back portion of the machine body frame 2. The transmission case 4 is fixed to a rear portion of the engine 3. A front portion of the machine body frame 2 is supported by the pair of left and right front wheels 5 through a front axle mechanism (not illustrated). A rear portion of the transmission case 4 is supported by the pair of left and right rear wheels 6 through a rear axle mechanism (not illustrated). The engine 3 is covered with the bonnet 7.

Power of the engine 3 can be transmitted to the front wheels 5 through the front axle mechanism and can be transmitted to the rear wheels 6 through the rear axle mechanism after being shifted by a transmission device (not illustrated) accommodated in the transmission case 4. The front wheels 5 and the rear wheels 6 are rotationally driven by the power of the engine 3, and the tractor 1 can travel.

The cabin 8 is provided behind the engine 3. Inside the cabin 8, a boarding portion 8a on which a worker boards is formed. A bottom portion 8b (see FIG. 2) forming a bottom surface of the cabin 8 is formed in a stepped shape such that a portion where a seat 16 is installed is higher than a portion where a worker places a foot. The steering wheel 9 and various operation tools for adjusting a turning angle of the front wheels 5 are disposed in the boarding portion 8a. Furthermore, as illustrated in FIG. 2, the boarding portion 8a is provided with the seat 16 on which the worker sits, an armrest 17 on which the worker puts his/her elbow, and the like. The armrests 17 are provided on both left and right sides of the seat 16. A loader lever 20 for operating the front loader 10 is provided in front of the right armrest 17.

The front loader 10 is mounted on a front portion of the tractor 1 illustrated in FIG. 1. The front loader 10 includes a boom 11, a bucket 12, a boom cylinder 13, a bucket cylinder 14, a valve 15 (see FIG. 2), and the like.

The boom 11 is disposed so as to extend forward and downward. The bucket 12 is detachably coupled to a front end portion of the boom 11. The valve 15 illustrated in FIG. 2 is configured to be able to feed hydraulic pressure to the boom cylinder 13 and the bucket cylinder 14. The valve 15 is disposed below the boarding portion 8a. The boom 11 illustrated in FIG. 1 can be rotated with respect to a vehicle body by expansion and contraction of the boom cylinder 13 by the hydraulic pressure from the valve 15. The bucket 12 can rotate with respect to the boom 11 when the bucket cylinder 14 is expanded and contracted by the hydraulic pressure from the valve 15. As described above, the work of transporting earth and sand, and the like can be carried out while appropriately rotating the boom 11 and the bucket 12.

Hereinafter, configurations of the loader lever 20 and various members for transmitting an operation force of the loader lever 20 to the valve 15 will be described with reference to FIGS. 2 to 14. Specifically, the loader lever 20, an operation mechanism 30, a first cable 40, and a second cable 50 will be described.

Note that FIGS. 2 to 11 illustrate the loader lever 20 in a state of being moved to a neutral position, the operation mechanism 30, the first cable 40, and the second cable 50. Hereinafter, the configuration of the loader lever 20 and the like will be described on the assumption that the loader lever 20 is in the neutral position.

Figure 3:
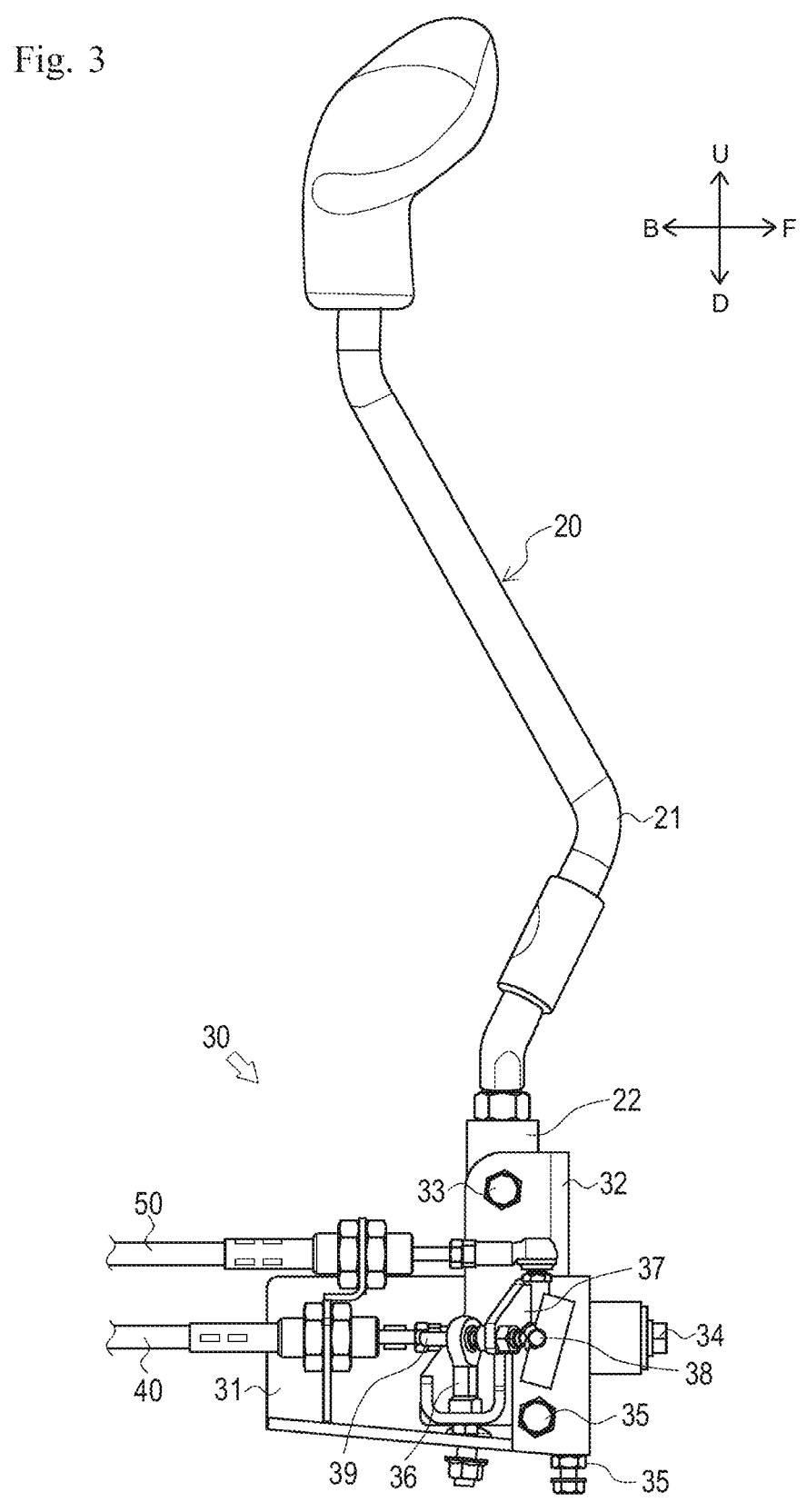
Figure 4:
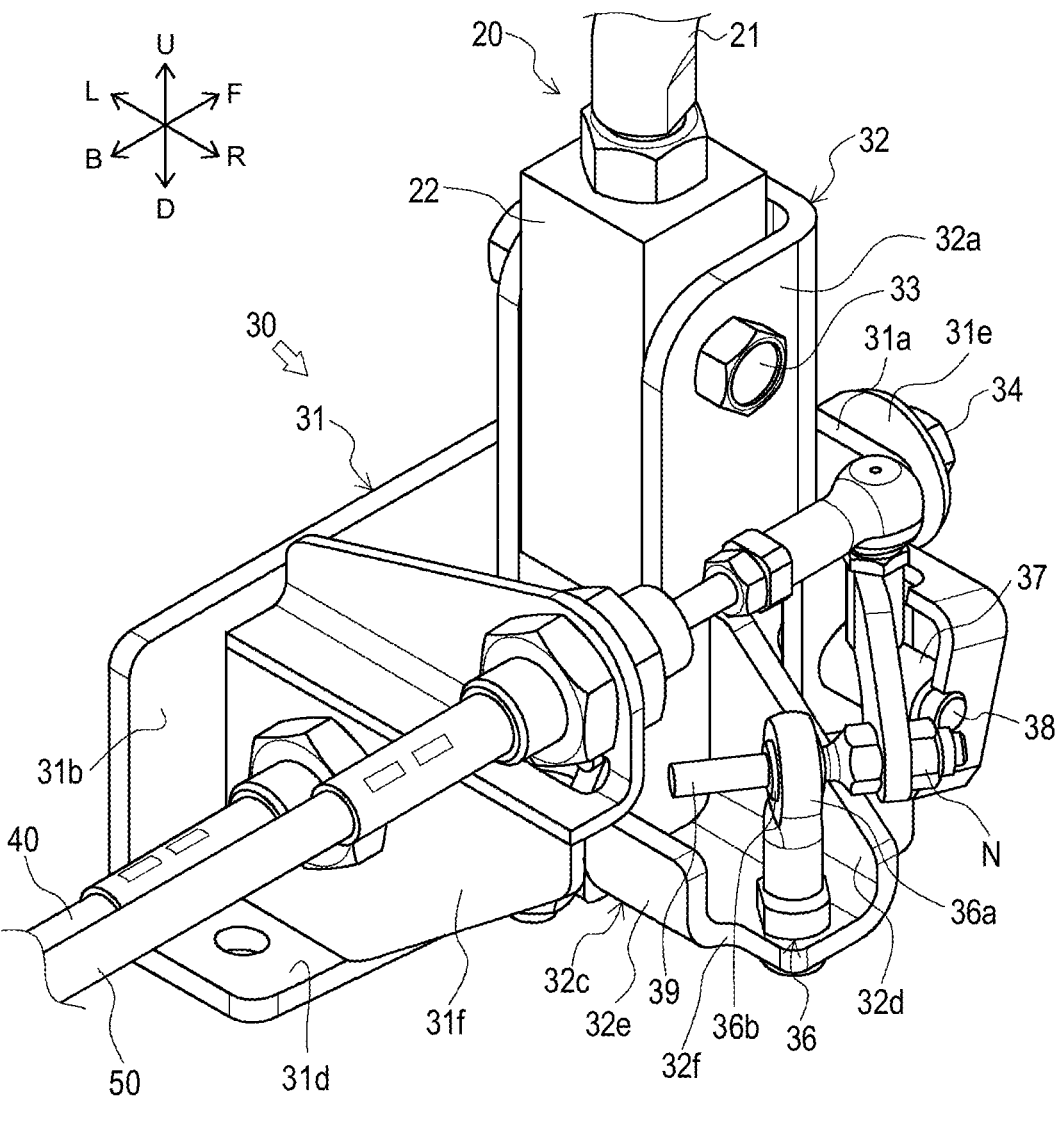
FIG. 4 is a perspective view illustrating the operation mechanism.

The loader lever 20 is disposed behind and above the valve 15 across the bottom portion 8b of the cabin 8. As illustrated in FIGS. 3 and 4, the loader lever 20 includes a lever main body 21 and an insertion portion 22. The lever main body 21 is formed to extend substantially downward from a grip (upper end portion) gripped by a worker.

The insertion portion 22 is a portion through which an upper rocking shaft 33 of the operation mechanism 30 described later is inserted. The insertion portion 22 is formed in a substantially rectangular parallelepiped shape whose longitudinal direction is oriented in a vertical direction. The lever main body 21 is fixed to an upper surface of the insertion portion 22. The first cable 40 is coupled to a lower end portion of the insertion portion 22 (see FIG. 9 and the like). Furthermore, the second cable 50 is also coupled to the insertion portion 22 through the operation mechanism 30.

Figure 5:
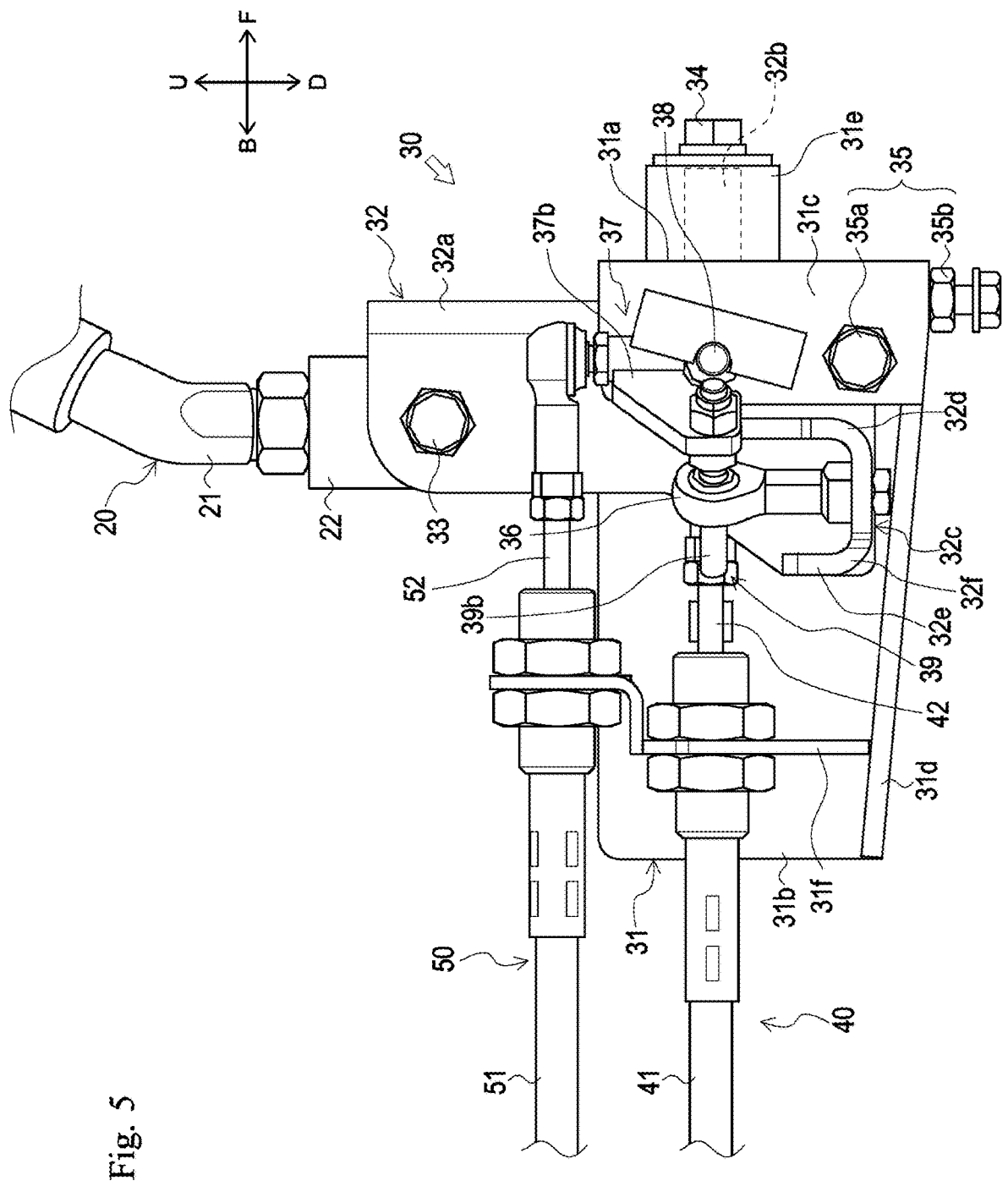
FIG. 5 is a side view of the same.
Figure 6:
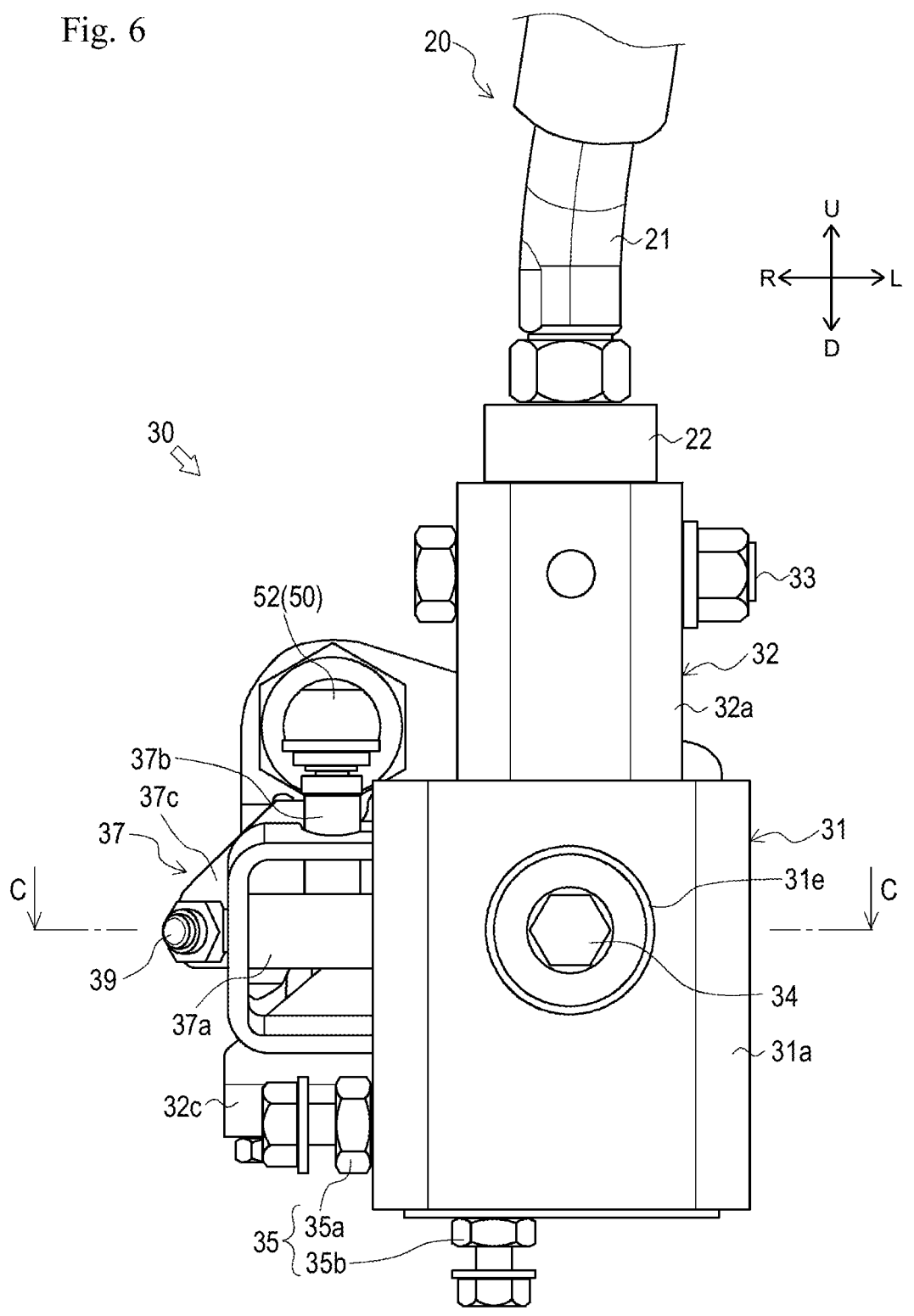
FIG. 6 is a front view of the same.

The operation mechanism 30 illustrated in FIGS. 4 to 6 is for transmitting a rocking operation of the loader lever 20 in the front-back direction and the left-right direction to the first cable 40 and the second cable 50. The operation mechanism 30 is provided at a lower end portion of the loader lever 20. As described later, the operation mechanism 30 converts the rocking operation of the loader lever 20 into a reciprocating motion of the first cable 40 and the second cable 50 in the front-back direction. The operation mechanism 30 includes a support member 31, a first rocking member 32, the upper rocking shaft 33, a bolt 34, a restriction member 35, a rod end 36, a second rocking member 37, a lower second rocking shaft 38, and a coupling rod 39.

Figure 7:
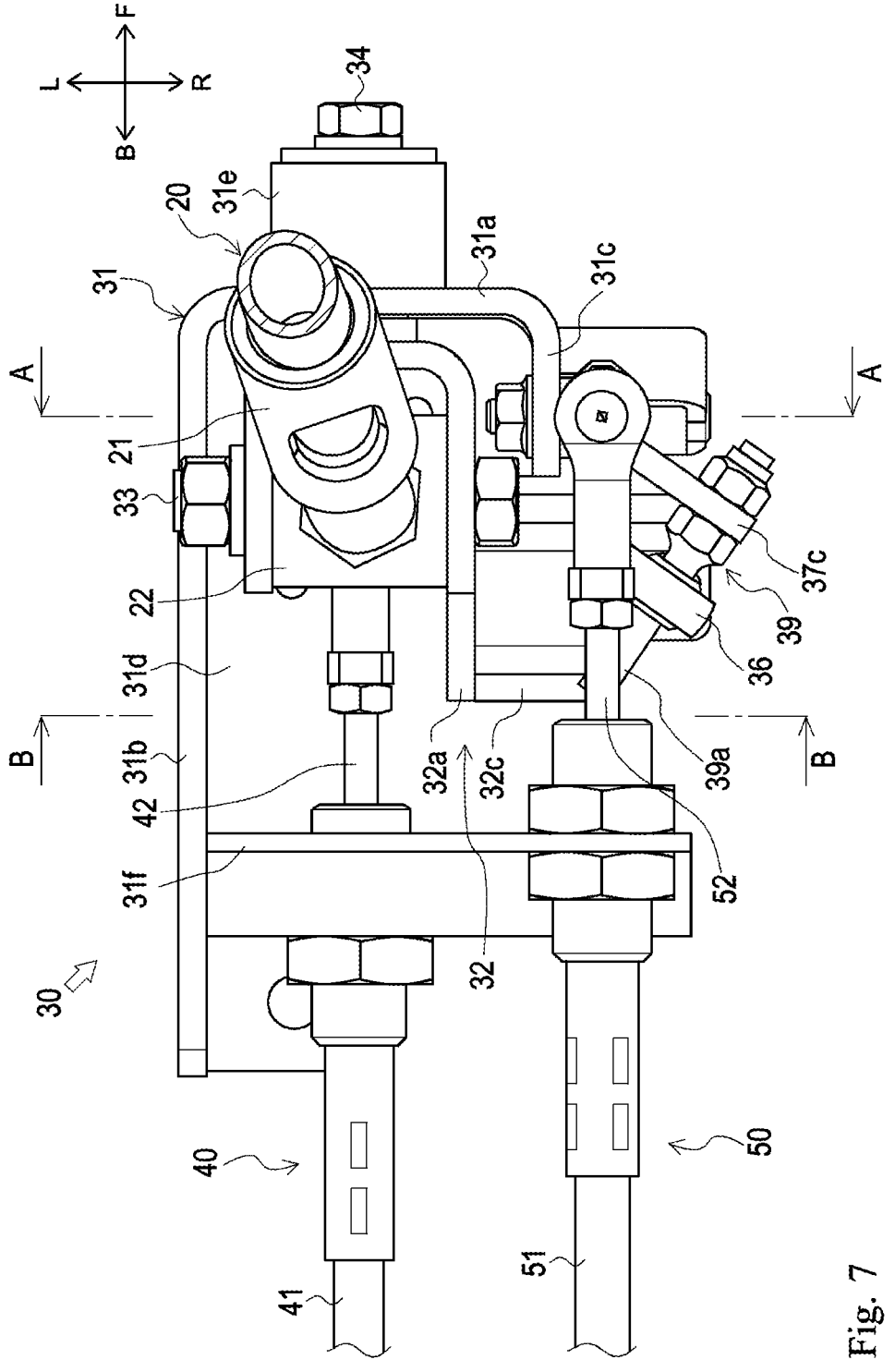
FIG. 7 is a plan view with a partially cross-sectional view of the same.

The support member 31 is for supporting the first rocking member 32, the second rocking member 37, and the like described later. The support member 31 is formed by appropriately bending a substantially plate-shaped member. The support member 31 is fixed to the vehicle body through a bolt, a nut, and the like. As illustrated in FIGS. 4, 5, and 7, the support member 31 includes a front wall portion 31a, a pair of left and right wall portions 31b and 31c formed so as to sandwich the front wall portion 31a, a bottom portion 31d forming a bottom surface, a boss portion 31e formed on the front wall portion 31a, and a cable support portion 31f fixed to a rear portion of the left wall portion 31b.

The right wall portion 31c is formed to have a shorter front-back width than the left wall portion 31b. The boss portion 31e is formed in a substantially cylindrical shape with an axial direction oriented in the front-back direction. As illustrated in FIGS. 5 and 7, the boss portion 31e is formed so as to protrude forward from the front wall portion 31a. The cable support portion 31f is formed at a rear portion of the support member 31. The cable support portion 31f is formed so as to extend upward from the bottom portion 31d, and is formed such that the first cable 40 and the second cable 50 can be inserted therethrough.

Figure 9:
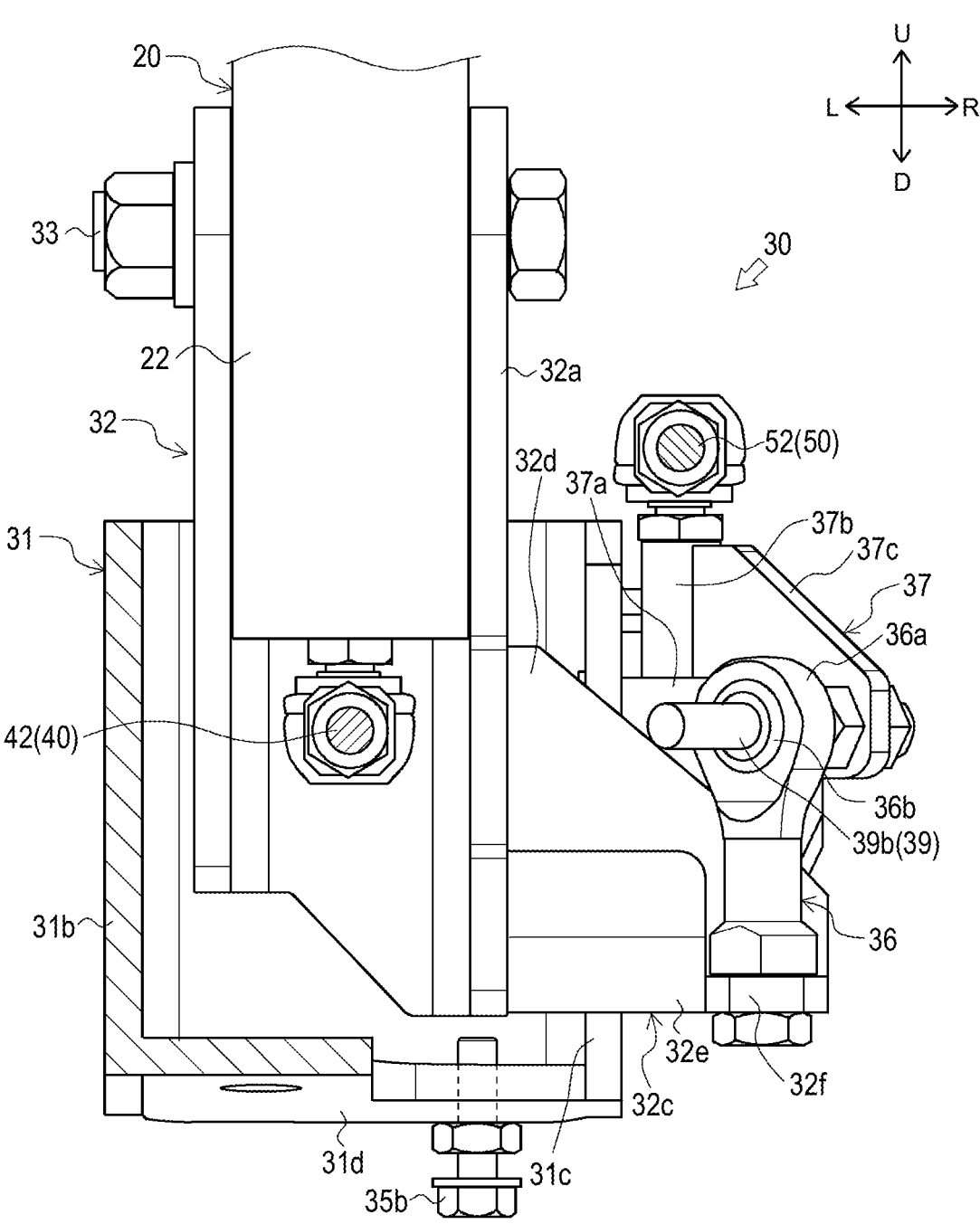
FIG. 9 is a cross-sectional view taken along line B-B.

The first rocking member 32 is a member that rocks in the left-right direction according to the rocking operation of the loader lever 20 in the left-right direction. The first rocking member 32 is formed by appropriately combining substantially plate-shaped members. As illustrated in FIGS. 4, 7, and 9, the first rocking member 32 includes a first attachment portion 32a and a second attachment portion 32c.

The first attachment portion 32a is a portion to which the loader lever 20 is attached. The first attachment portion 32a is formed in a substantially U shape in plan view with an opening toward the back. A lower portion of the first attachment portion 32a is disposed inside the support member 31. The insertion portion 22 of the loader lever 20 is disposed inside the first attachment portion 32a.

Figure 10:
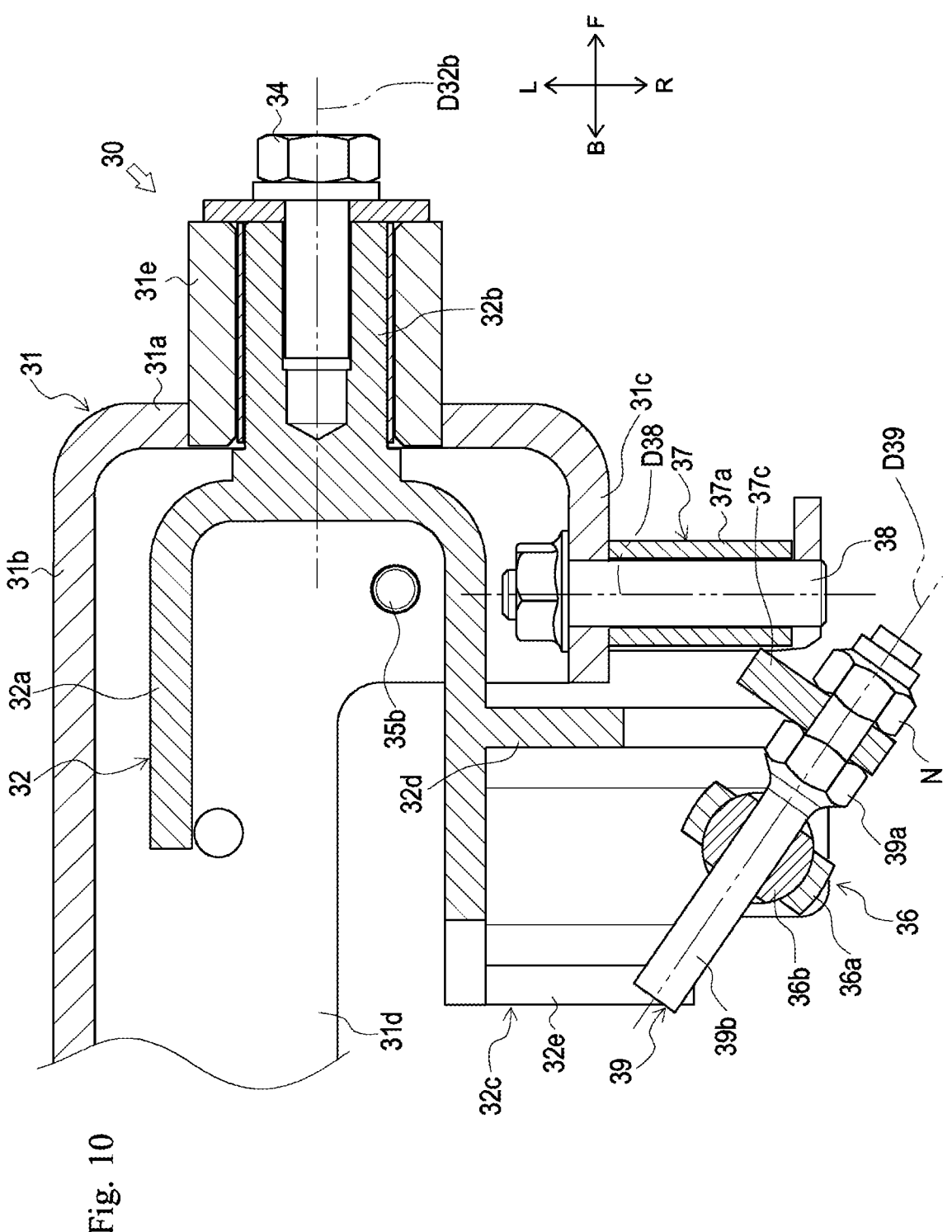
FIG. 10 is a cross-sectional view taken along line C-C.

As illustrated in FIG. 10, a lower first rocking shaft 32b extending forward is formed in the first attachment portion 32a. The lower first rocking shaft 32b is formed in a substantially cylindrical shape with an axis D32b facing the front-back direction. The lower first rocking shaft 32b is located in front of and below the upper rocking shaft 33 (see FIG. 5). The lower first rocking shaft 32b is inserted into the boss portion 31e of the support member 31. As a result, the first rocking member 32 is provided to be rockable in the left-right direction and to be non-rockable in the front-back direction with respect to the support member 31. Furthermore, as a result, the loader lever 20 (see FIG. 4) can rock in the left-right direction about the lower first rocking shaft 32b.

The second attachment portion 32c illustrated in FIGS. 4 and 9 is a portion to which the rod end 36 described later is attached. The second attachment portion 32c is formed on a right side surface of the first attachment portion 32a. The second attachment portion 32c is located behind the right wall portion 31c of the support member 31 (see FIG. 10). The second attachment portion 32c includes a pair of front and back wall portions 32d and 32e, and is formed in a substantially U shape whose upper side is opened in side view. As a result, the strength of the second attachment portion 32c can be relatively increased.

As illustrated in FIG. 9, an upper surface of the front wall portion 32d of the second attachment portion 32c is formed so as to be inclined rightward and downward. A vertical width of the back wall portion 32e of the second attachment portion 32c is shorter than a vertical width of the front wall portion 32d (upper end portion). With such a configuration, it is possible to prevent the second rocking member 37 and the like from coming into contact with the first rocking member 32 when the second rocking member 37 and the coupling rod 39 described later rock.

As illustrated in FIGS. 4 and 9, a cutout portion 32f is formed at a right end portion of the back wall portion 32e of the second attachment portion 32c. When attaching the rod end 36 to the second attachment portion 32c, the worker can use a tool such as a wrench using a space of the cutout portion 32f. As a result, the rod end 36 can be easily attached to the second attachment portion 32c.

Figure 8:
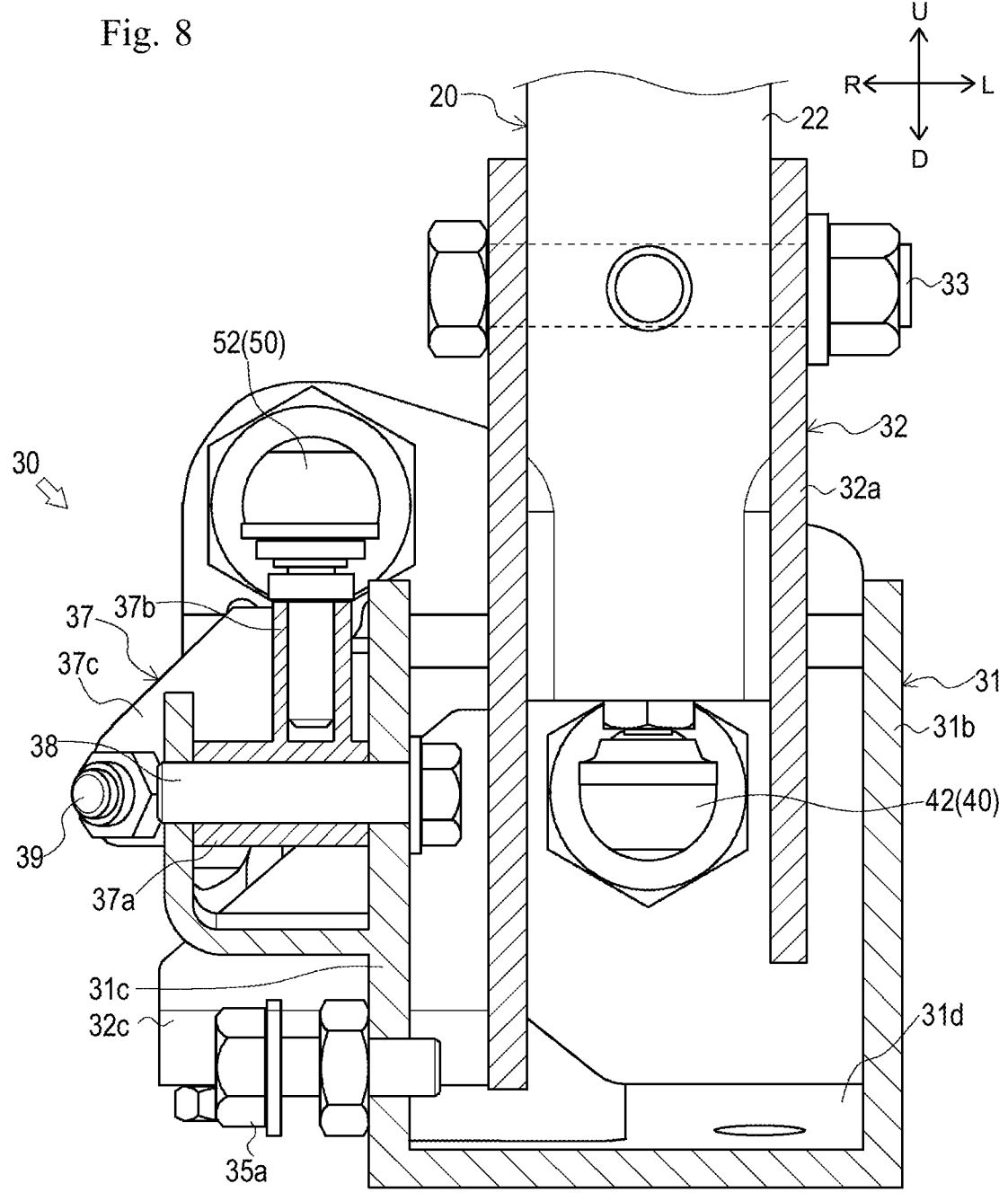
FIG. 8 is a cross-sectional view taken along line A-A.

The upper rocking shaft 33 illustrated in FIGS. 4, 7, and 8 is for supporting the loader lever 20 so as to be rockable in the front-back direction. The upper rocking shaft 33 is disposed with an axial direction oriented in the left-right direction. In the present embodiment, a bolt longer than a left-right width of the first attachment portion 32a is used as the upper rocking shaft 33. The upper rocking shaft 33 is inserted through the first attachment portion 32a of the first rocking member 32 and the insertion portion 22 of the loader lever 20. As a result, the upper rocking shaft 33 supports the loader lever 20 so as to be rockable in the front-back direction. Focusing on one point (virtual point) on the loader lever 20, the virtual point moves on a first virtual plane P1 facing a direction perpendicular to an axis (left-right direction) of the upper rocking shaft 33 when the loader lever 20 rocks about the upper rocking shaft 33 (see FIG. 12).

The bolt 34 illustrated in FIG. 10 is for preventing the lower first rocking shaft 32b of the first rocking member 32 from coming off from the boss portion 31e of the support member 31. The bolt 34 is fastened to the lower first rocking shaft 32b.

The restriction member 35 illustrated in FIGS. 5 and 6 is for restricting rocking of the first rocking member 32 at a predetermined position. The restriction member 35 includes a first restriction member 35a and a second restriction member 35b.

The first restriction member 35a is for restricting rightward rocking of the first rocking member 32. As illustrated in FIG. 8, the first restriction member 35a includes a bolt and a nut attached to the right wall portion 31c of the support member 31. The first restriction member 35a is provided such that a shaft portion of the bolt protrudes from the right wall portion 31c toward the inside of the support member 31. In a case where the first rocking member 32 is rocked rightward by a predetermined angle, the first restriction member 35a abuts on the first attachment portion 32a.

As a result, the first restriction member 35a can restrict the excessive rightward rocking of the first rocking member 32, and the operability of the loader lever 20 can be improved. Furthermore, in the present embodiment, by adjusting a protrusion width of the bolt with respect to the right wall portion 31c, an angle at which the first rocking member 32 abuts on the first restriction member 35a can be easily adjusted.

The second restriction member 35b illustrated in FIGS. 5 and 9 is for restricting leftward rocking of the first rocking member 32. The second restriction member 35b includes a bolt and a nut attached to the bottom portion 31*d* of the support member 31. The second restriction member 35*b* is provided such that a shaft portion of the bolt extends from the bottom portion 31*d* to the inside of the support member 31. In a case where the first rocking member 32 is rocked leftward by a predetermined angle, the first rocking member 32 abuts on the first attachment portion 32*a*.

As a result, the second restriction member 35*b* can restrict excessive leftward rocking of the first rocking member 32, and the operability of the loader lever 20 can be improved. Furthermore, in the present embodiment, by adjusting a protrusion width of the bolt with respect to the bottom portion 31*d*, an angle at which the first rocking member 32 abuts on the second restriction member 35*b* can be easily adjusted.

Figure 11:
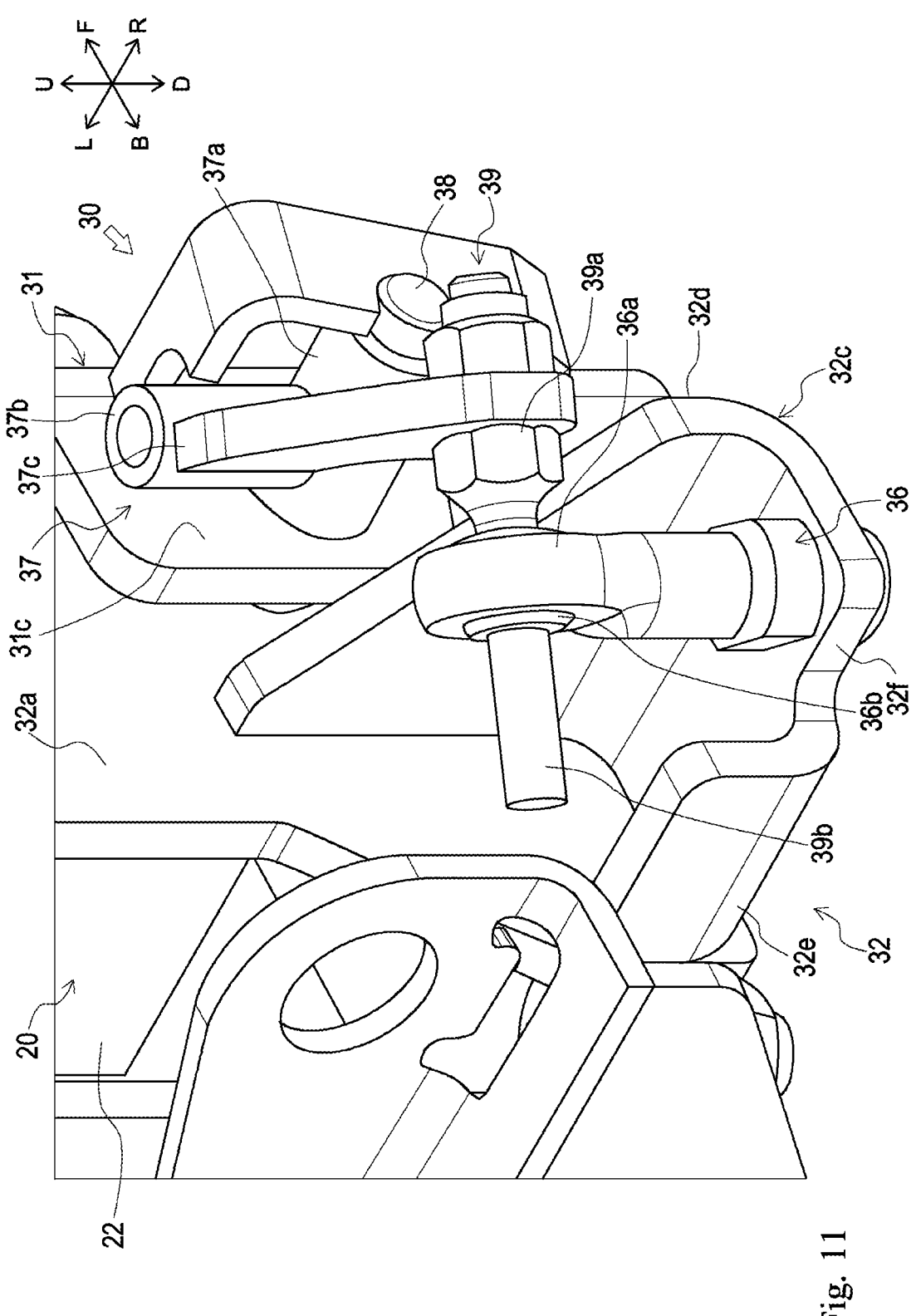
FIG. 11 is an enlarged perspective view illustrating a rod end and a second rocking member.

The rod end 36 illustrated in FIGS. 9 to 11 is a member that rocks in accordance with the rocking operation of the loader lever 20 in the left-right direction. Note that, in FIG. 11, the first cable 40 and the second cable 50 are not illustrated. The rod end 36 is fixed to the second attachment portion 32*c* of the first rocking member 32. The rod end 36 is formed so as to extend upward from the second attachment portion 32*c*. The rod end 36 includes an outer ring 36*a* and an inner ring 36*b*.

The outer ring 36*a* is a portion that rollably supports the inner ring 36*b*. The outer ring 36*a* is formed in a substantially annular shape. The outer ring 36*a* is formed at an upper end portion of the rod end 36. The inner ring 36*b* is a substantially spherical portion through which the coupling rod 39 described later can be inserted. The inner ring 36*b* is accommodated inside the outer ring 36*a*. The outer ring 36*a* and the inner ring 36*b* are disposed at the same height position as the lower first rocking shaft 32*b* (see FIG. 5).

In a case where the first rocking member 32 is rocked in the left-right direction, the rod end 36 rocks about the lower first rocking shaft 32*b*. At this time, the rod end 36 moves on a second virtual plane P2 facing a direction perpendicular to the axis D32*b* (front-back direction) of the lower first rocking shaft 32*b* (see FIG. 13).

The second rocking member 37 illustrated in FIGS. 8, 10, and 11 is a member rockable about the lower second rocking shaft 38 described later. The second rocking member 37 is attached to the right wall portion 31*c* of the support member 31 through the lower second rocking shaft 38, and is disposed in front of the rod end 36. The second rocking member 37 includes an insertion portion 37*a*, an extension portion 37*b*, and a plate-shaped portion 37*c*.

The insertion portion 37*a* is a portion through which the lower second rocking shaft 38 is inserted. The insertion portion 37*a* is formed in a cylindrical shape with an axial direction oriented in the left-right direction. The extension portion 37*b* is formed so as to extend upward from a top portion of the insertion portion 37*a*. The extension portion 37*b* is formed in a cylindrical shape with an axial direction oriented in the vertical direction. The second cable 50 is coupled to the extension portion 37*b*. The plate-shaped portion 37*c* is a portion to which the coupling rod 39 is fixed. The plate-shaped portion 37*c* is formed in a flat plate shape and is disposed in parallel with the axial direction of the extension portion 37*b*. The plate-shaped portion 37*c* is formed so as to protrude rightward and backward from the extension portion 37*b*. Furthermore, the plate-shaped portion 37*c* is formed so as to face an upper end portion of the rod end 36.

The lower second rocking shaft 38 is for rockably supporting the second rocking member 37. The lower second rocking shaft 38 is disposed with an axis D38 facing the left-right direction (in a direction perpendicular to the lower first rocking shaft 32*b*). Furthermore, the lower second rocking shaft 38 is disposed at the same height position as the lower first rocking shaft 32*b* (see FIG. 5). As a result, an increase in a vertical width of the operation mechanism 30 can be suppressed, and the operation mechanism 30 can be downsized. In the present embodiment, the lower second rocking shaft 38 includes a bolt. The lower second rocking shaft 38 is inserted through the right wall portion 31*c* of the support member 31 and the insertion portion 37*a* of the second rocking member 37. As a result, the lower second rocking shaft 38 rockably supports the second rocking member 37. Focusing on one point (virtual point) on the second rocking member 37, the virtual point moves on a virtual plane facing a direction perpendicular to the axis D38 (left-right direction) of the lower second rocking shaft 38 when the second rocking member 37 rocks about the lower second rocking shaft 38 (see FIG. 13). Since the virtual plane is parallel to the first virtual plane P1 (see FIG. 12) of the loader lever 20 described above, hereinafter, the virtual plane of the second rocking member 37 is also referred to as first virtual plane P1 for convenience.

The coupling rod 39 illustrated in FIGS. 10 and 11 is for coupling the first rocking member 32 and the second rocking member 37 through the rod end 36. The coupling rod 39 is formed in a longitudinal shape extending leftward toward the back. The coupling rod 39 includes a fixing portion 39*a* and a shaft-shaped portion 39*b*.

The fixing portion 39*a* is formed at a right front end portion of the coupling rod 39. The fixing portion 39*a* illustrated in FIG. 10 is inserted into the plate-shaped portion 37*c* of the second rocking member 37. The fixing portion 39*a* is fixed to the plate-shaped portion 37*c* of the second rocking member 37 by fastening a nut N to the insertion portion.

The shaft-shaped portion 39*b* is formed so as to extend leftward and backward from the fixing portion 39*a*. The shaft-shaped portion 39*b* is inclined with respect to the axis D38 (left-right direction) of the lower second rocking shaft 38. More specifically, the shaft-shaped portion 39*b* is disposed so as not to be parallel to the axis D38 of the lower second rocking shaft 38. Furthermore, the shaft-shaped portion 39*b* is disposed so as to be inclined also with respect to a plane perpendicular to the axis D38 of the lower second rocking shaft 38. That is, the shaft-shaped portion 39*b* is inclined within an angle range in which an angle (acute angle) formed between the shaft-shaped portion and a direction of the axis D38 of the lower second rocking shaft 38 is larger than 0 degrees and smaller than 90 degrees. The shaft-shaped portion 39*b* is inserted into the inner ring 36*b* of the rod end 36. As a result, the shaft-shaped portion 39*b* is configured to be slidable with respect to the rod end 36 along an axis D39.

Note that the operation mechanism 30 can also be provided with a lever lock mechanism (not illustrated) that physically restricts rocking of the loader lever 20 and disables an operation of the loader lever 20. The lever lock mechanism may be configured to restrict the rocking of the loader lever 20 by allowing a rod-shaped member (pin or the like) to pass through the insertion portion 22, the support member 31, the first rocking member 32, and the like, for example. By restricting the rocking of the loader lever 20 by the lever lock mechanism, it is possible to prevent the valve 15 from being actuated by an erroneous operation due to unintended contact or the like with the loader lever 20. Note that a specific configuration of the lever lock mechanism is not particularly limited.

Figure 2:
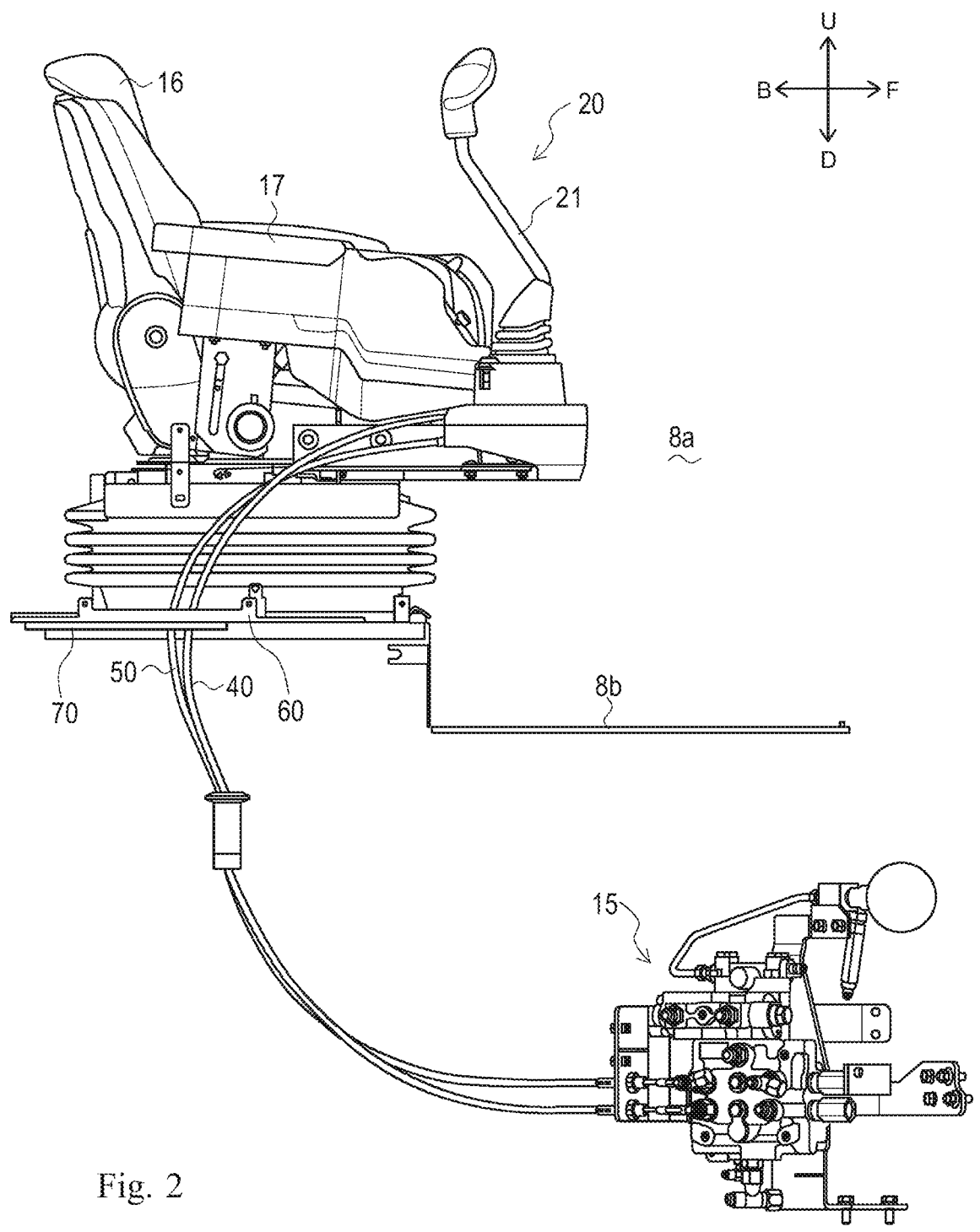
FIG. 2 is a side view illustrating a seat and a valve.

The first cable 40 illustrated in FIGS. 2 and 5 is for transmitting the rocking operation of the loader lever 20 in the front-back direction to the valve 15. The first cable 40 is formed in a longitudinal shape (linear shape) and has flexibility. As illustrated in FIG. 5, the first cable 40 includes an outer cable 41 and an inner cable 42.

The outer cable 41 is formed so as to cover the inner cable 42. One end portion of the outer cable 41 is fixed to the cable support portion 31*f* of the support member 31 through a nut. The outer cable 41 is supported by the cable support portion 31*f* so as to extend along the front-back direction. The other end portion of the outer cable 41 is fixed to the vehicle body in the vicinity of the valve 15 illustrated in FIG. 2.

One end portion of the inner cable 42 illustrated in FIG. 5 protrudes forward from the one end portion of the outer cable 41 and is rotatably coupled to a lower surface of the insertion portion 22 of the loader lever 20 (see FIG. 9). The other end portion of the inner cable 42 protrudes forward from the other end portion of the outer cable 41 and is coupled to the valve 15 illustrated in FIG. 2. The inner cable 42 is moved in the front-back direction along with the rocking of the insertion portion 22 in the front-back direction, and slides with respect to the outer cable 41.

The second cable 50 is for transmitting the rocking operation of the loader lever 20 in the left-right direction to the valve 15. The second cable 50 is formed in a longitudinal shape (linear shape) and has flexibility. As illustrated in FIG. 5, the second cable 50 includes an outer cable 51 and an inner cable 52.

The outer cable 51 is formed so as to cover the inner cable 52. Similarly to the first cable 40, the outer cable 51 is fixed to the vicinity of the valve 15 and the cable support portion 31*f*. The outer cable 51 is supported by the cable support portion 31*f* so as to extend along the front-back direction. One end portion of the inner cable 52 protrudes forward from one end portion of the outer cable 51 and is rotatably coupled to the extension portion 37*b* of the second rocking member 37. The other end portion of the inner cable 52 protrudes forward from the other end portion of the outer cable 51 and is coupled to the valve 15 illustrated in FIG. 2. The inner cable 52 is moved in the front-back direction as the second rocking member 37 rocks, and slides with respect to the outer cable 51.

As illustrated in FIG. 2, the first cable 40 and the second cable 50 are disposed so as to be bent in a substantially U shape opened forward in side view. More specifically, the first cable 40 and the second cable 50 extend substantially backward from the lower end portion of the loader lever 20, and are disposed such that the middle portion bends downward at the boarding portion 8*a*. The middle portion of the first cable 40 and the second cable 50 is guided to the lower side of the bottom portion 8*b* of the boarding portion 8*a* through a movable member 70 to be described later. Furthermore, the first cable 40 and the second cable 50 extend forward below the boarding portion 8*a*.

In the present embodiment, the rocking operation of the loader lever 20 is converted into the movement of the inner cables 42 and 52 in the front-back direction by the operation mechanism 30. As a result, the valve 15 is operated, and the front loader 10 is operated. Hereinafter, a specific description will be given.

Figure 12:
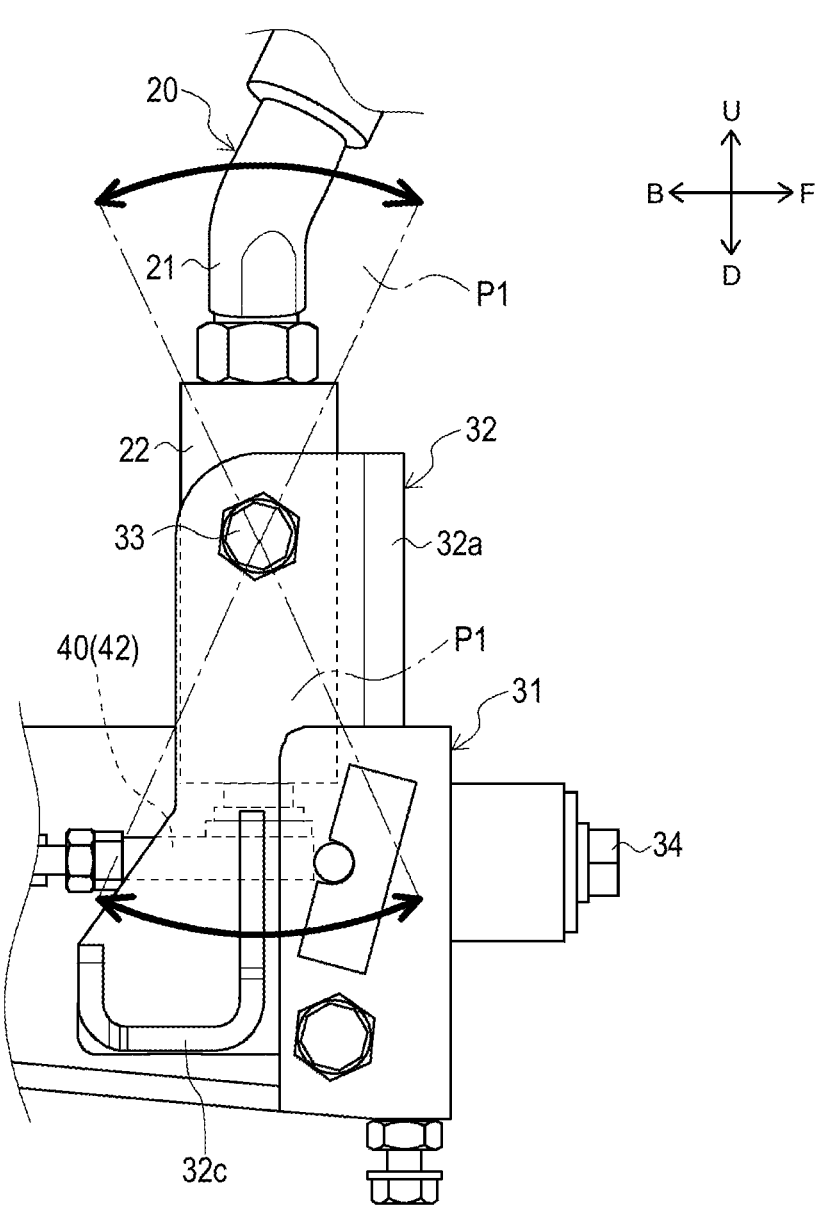
FIG. 12 is a side view illustrating a state in which a lever body and an insertion portion rock back and forth.

First, a flow in which the rocking operation of the loader lever 20 in the front-back direction is converted into the movement of the inner cable 42 in the front-back direction will be described with reference to FIG. 12. Note that, in FIG. 12, description of some members (the second rocking member 37, the coupling rod 39, and the like) not related to the rocking operation of the loader lever 20 in the front-back direction is omitted.

When the lever main body 21 of the loader lever 20 is rocked in the front-back direction, the insertion portion 22 is rocked in the front-back direction about the upper rocking shaft 33. With this rocking, the inner cable 42 coupled to the lower end portion of the insertion portion 22 is moved back and forth. As a result, the rocking operation of the loader lever 20 in the front-back direction can be converted into the front-back movement of the inner cable 42, and the valve 15 can be operated.

As described above, the lever main body 21 to which the operation force is input and the insertion portion 22 that outputs the operation force to the first cable 40 each move on the first virtual plane P1 when rocking. In this way, in a case where the lever main body 21 and the insertion portion 22 move on the same plane, the operation force can be converted with a simple configuration such as directly coupling the lever main body 21 and the insertion portion 22.

Next, a flow in which the rocking operation of the loader lever 20 in the left-right direction is converted into the movement of the inner cable 52 in the front-back direction will be described.

When the lever main body 21 of the loader lever 20 illustrated in FIG. 3 is rocked and operated in the left-right direction, the insertion portion 22 and the first rocking member 32 are rocked about the lower first rocking shaft 32*b* illustrated in FIG. 5. Along with the rocking, the rod end 36 is also rocked about the lower first rocking shaft 32*b*.

Figure 13:
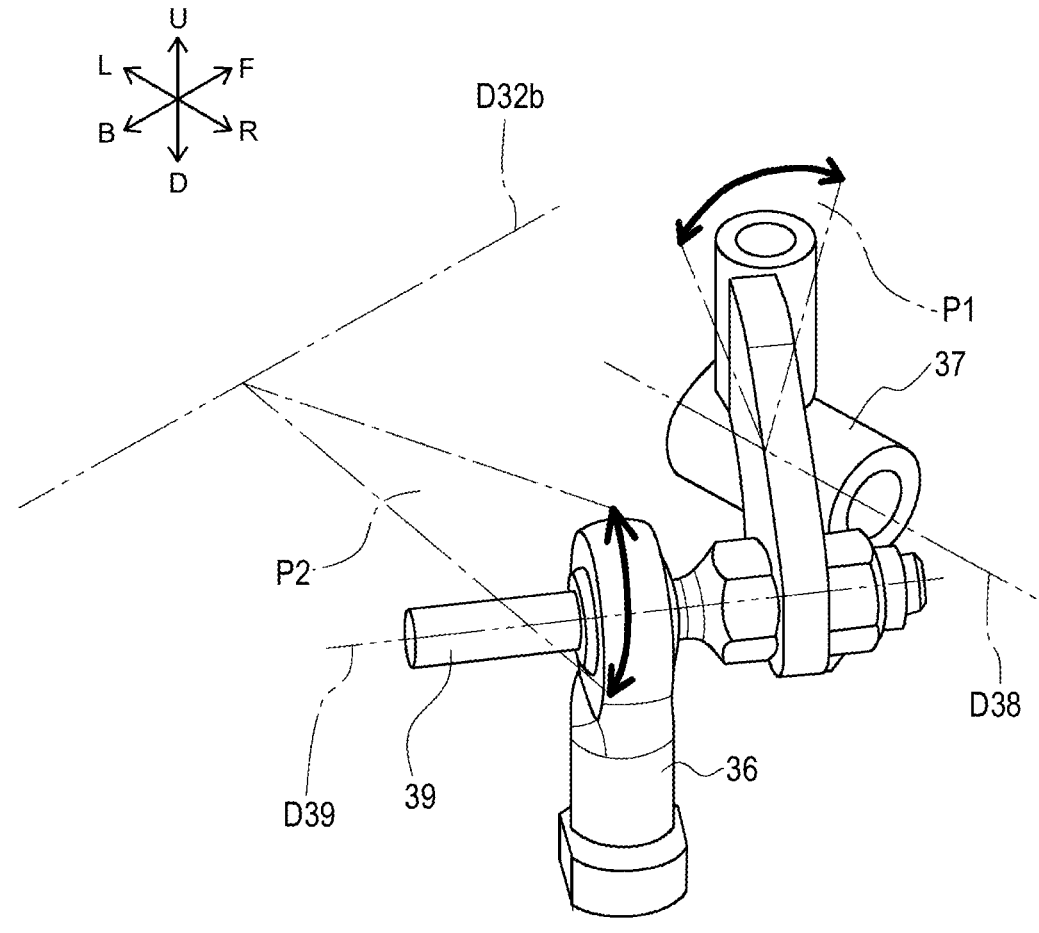
FIG. 13 is a perspective view illustrating a state in which the rod end and the second rocking member rock.

As described above, the rod end 36 moves in a circumferential direction about the axis D32*b* of the lower first rocking shaft 32*b* on the second virtual plane P2 illustrated in FIG. 13 at the time of rocking. On the other hand, when rocking, the second rocking member 37 moves in the circumferential direction about the axis D38 of the lower second rocking shaft 38 on the first virtual plane P1 facing the direction perpendicular to the second virtual plane P2 (left-right direction). In such a configuration, the rod end 36 is displaced leftward and rightward with respect to the second rocking member 37 when rocking, and the second rocking member 37 is displaced forward and backward with respect to the rod end 36 when rocking. In a case where a plurality of link mechanisms is provided to absorb the front-back and left-right displacements, the structure may be complicated.

In the present embodiment, the structure can be simplified by providing the coupling rod 39 slidable with respect to the rod end 36. Hereinafter, a case where the loader lever 20 is rocked and operated leftward will be described as an example.

Figure 14:
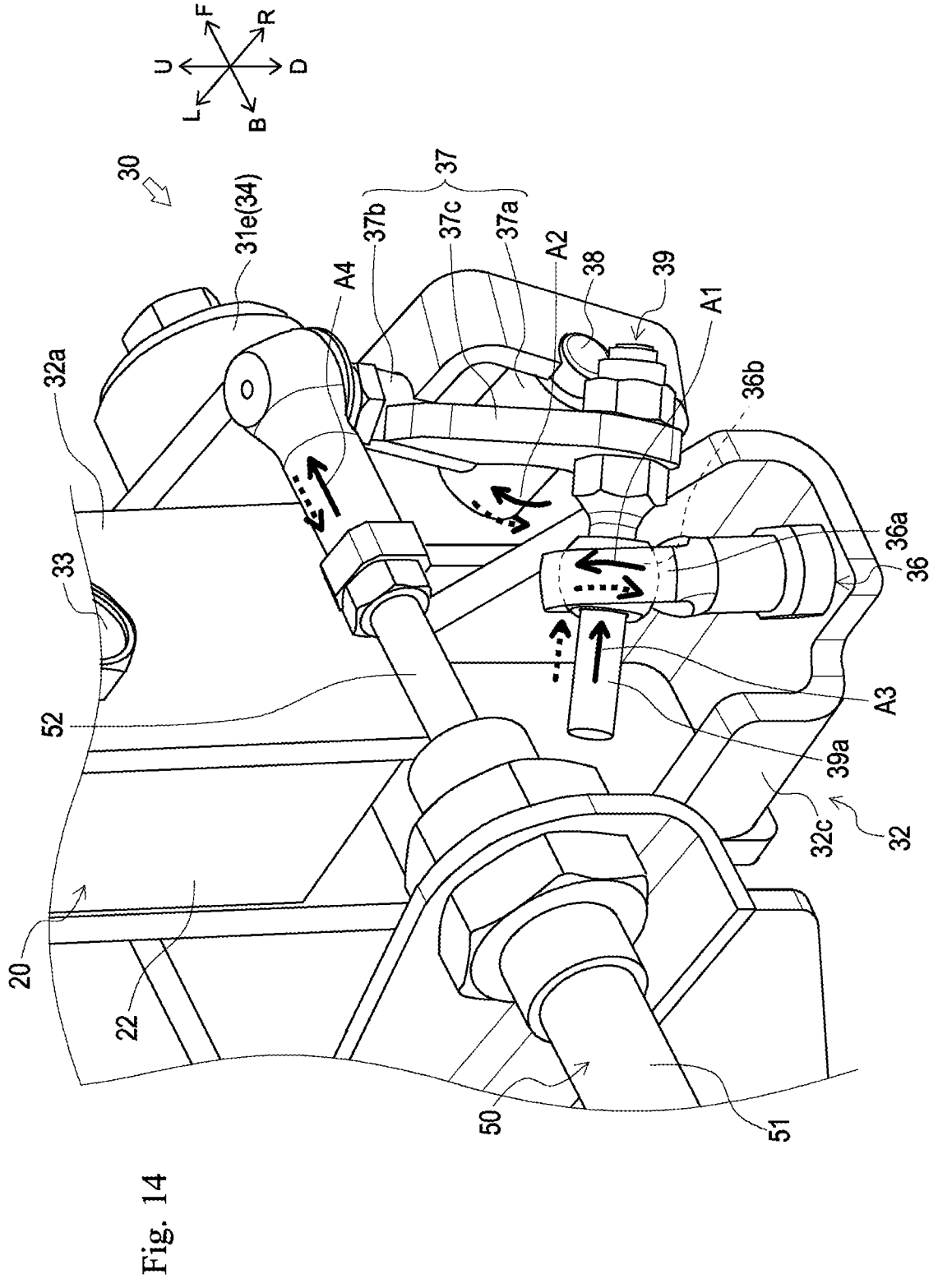
FIG. 14 is a perspective view illustrating movement directions of various members in a case where the loader lever is rocked leftward.

As indicated by an arrow A1 in FIG. 14, when the loader lever 20 is rocked and operated leftward, the rod end 36 is rocked leftward and upward (counterclockwise direction in rear view). At this time, the second rocking member 37 is pressed by the rod end 36 through the coupling rod 39.

Due to the pressing of the rod end 36, the second rocking member 37 tends to rock in the clockwise direction in right side view about the lower second rocking shaft 38 as indicated by an arrow A2 in FIG. 14. As a result, the coupling rod 39 is rocked forward and upward (clockwise direction in right side view indicated by the arrow A2 in FIG. 14) about the lower second rocking shaft 38 while sliding to the axis D39 (right front indicated by an arrow A3 in FIG. 14) with respect to the inner ring 36*b*. By thus sliding the coupling rod 39 in an oblique direction, the second rocking member 37 can be rocked while absorbing the displacements of the rod end 36 and the second rocking member 37 in the left-right direction and the front-back direction.

Furthermore, as the rod end 36 and the second rocking member 37 rock, the inner ring 36b of the rod end 36 rolls with respect to the outer ring 36a. This makes it possible to absorb a change in an orientation of the coupling rod 39 with respect to the rod end 36.

As indicated by an arrow A4 in FIG. 14, the extension portion 37b is rocked substantially forward by the rocking of the second rocking member 37, and the second cable 50 (inner cable 52) is pulled forward. Thus, the leftward rocking operation of the loader lever 20 is converted into the forward movement of the second cable 50.

As described above, in the present embodiment, even in a case where the rod end 36 and the second rocking member 37 move on different planes (the second virtual plane P2 and the first virtual plane P1) at the time of rocking, the leftward rocking of the loader lever 20 can be converted into the forward movement of the second cable 50 with a simple configuration by sliding the coupling rod 39 with the axis D39 inclined with respect to the lower second rocking shaft 38. As a result, since it is possible to suppress an increase in the number of link mechanisms (fulcrums of the link), it is possible to suppress an increase in rattling to prevent deterioration of the operational feeling, and it is possible to operate the loader lever 20 with a light force. Furthermore, it is also possible to reduce the cost by suppressing an increase in the number of components.

Note that, in a case where the loader lever 20 is rocked and operated rightward, the operation mechanism 30 operates substantially in the same manner as the rocking operation leftward, and can convert the rocking operation of the loader lever 20 into the rocking of the second rocking member 37 (backward movement of the second cable 50).

More specifically, in a case where the loader lever 20 is rocked and operated rightward, the rod end 36 and the second rocking member 37 are rocked in an opposite direction to the case where the loader lever 20 is rocked and operated leftward (see a broken line arrow in FIG. 14).

Note that, in the present embodiment, the coupling rod 39 is configured to slide in the same direction with respect to the rod end 36 regardless of whether the loader lever 20 is rocked rightward or leftward from the neutral position (see solid line and broken line arrows A3 in FIG. 14). With this configuration, the movable range (sliding range) of the coupling rod 39 can be narrowed, and the component can be downsized.

Furthermore, in the present embodiment, various members (the first rocking member 32 and the like) of the operation mechanism 30 are directly or indirectly coupled to the support member 31. As a result, since the operation mechanism 30 can be integrally formed through the support member 31, the operation mechanism 30 can be collectively attached to the vehicle body, and assemblability can be improved.

Hereinafter, a relationship between the seat 16, the armrest 17, the loader lever 20, and the operation mechanism 30 will be described with reference to FIGS. 15 to 17.

Figure 15:
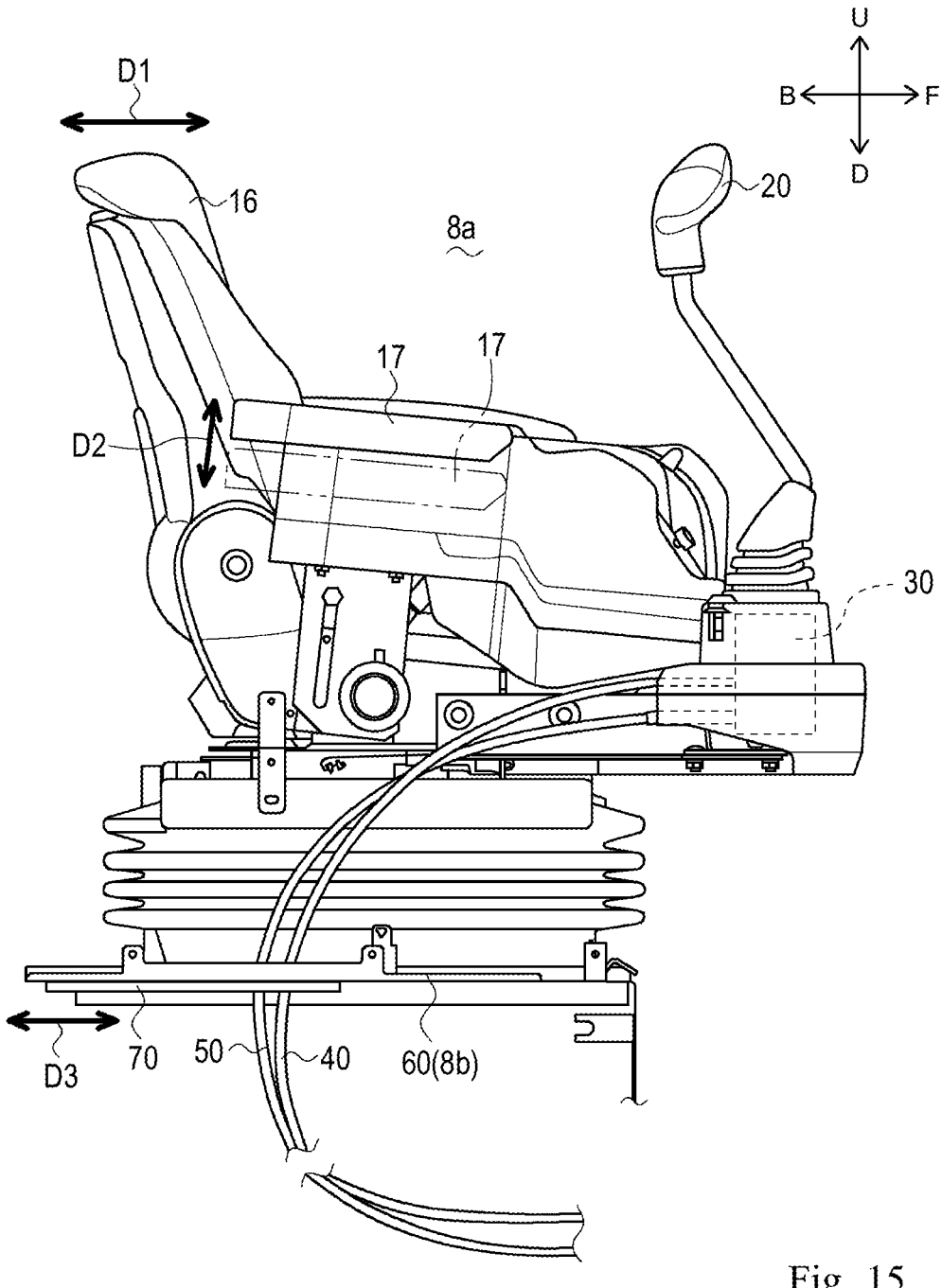
FIG. 15 is a side view illustrating movement directions of a seat, an armrest, and a movable member.

As indicated by an arrow D1 in FIG. 15, the seat 16 is configured to be capable of adjusting the front-back position with respect to the bottom portion 8b of the boarding portion 8a. The loader lever 20 and the operation mechanism 30 are fixed to the seat 16 and are configured to move back and forth integrally with the seat 16. With such a configuration, since a relative positional relationship between the seat 16 and the loader lever 20 can be maintained, it is possible to prevent a distance between the worker and the loader lever 20 from changing due to the position adjustment of the seat 16, and it is possible to prevent the operability of the loader lever 20 from deteriorating.

Furthermore, as indicated by an arrow D2 in FIG. 15, the armrest 17 is adjustable in a vertical position relative to the seat 16. The armrest 17 moves relative to the loader lever 20 and the operation mechanism 30 at the time of position adjustment. With such a configuration, a distance from the armrest 17 to the loader lever 20 can be adjusted according to the physique (arm length or the like) of the worker, and the operability of the loader lever 20 can be improved.

Here, when the loader lever 20 moves with the movement of the seat 16, the first cable 40 and the second cable 50 coupled to the loader lever 20 also move in the front-back direction. In the present embodiment, a plate-shaped member 60, the movable member 70, and a guide mechanism 80 (see FIG. 16) are provided so that the first cable 40 and the second cable 50 are not forcibly deformed by this movement. Hereinafter, a specific description will be given. Note that hereinafter, the first cable 40 and the second cable 50 are collectively referred to as "cables 40 and 50".

Figure 16:
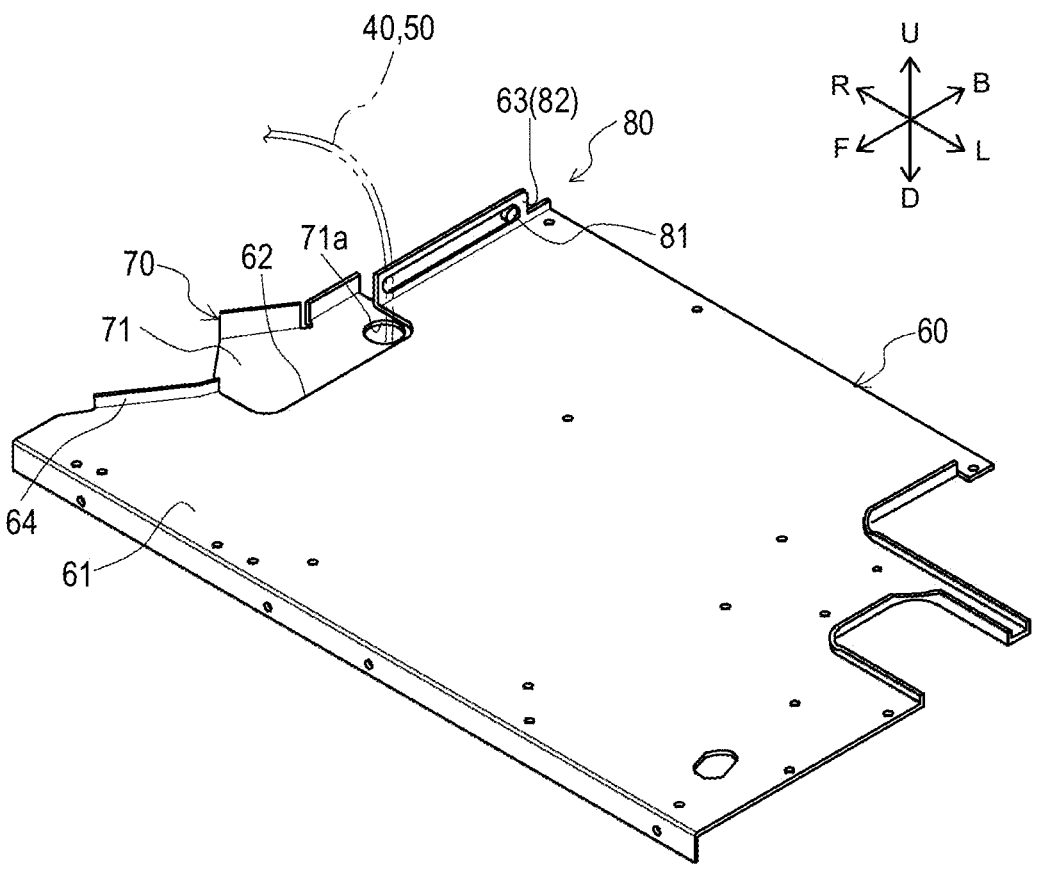
FIG. 16 is a perspective view illustrating a plate-shaped member and a movable member.

The plate-shaped member 60 illustrated in FIG. 16 is a member forming a part of the bottom portion 8b where the seat 16 is installed. The plate-shaped member 60 is fixed to the vehicle body. The plate-shaped member 60 includes a plate portion 61, a cutout portion 62, a back side extension portion 63, and a front side extension portion 64.

The plate portion 61 is a portion disposed with its plate surface facing up and down. The plate-shaped member 60 is formed by partially bending an end portion of the plate portion 61. The cutout portion 62 is formed in the middle portion in the front-back direction at a right end portion of the plate portion 61. For example, the cutout portion 62 is formed to have a front-back width substantially equal to a movable range of the seat 16.

The back side extension portion 63 is a portion extending upward from the plate portion 61 on the back side of the cutout portion 62. The back side extension portion 63 is disposed with its plate surface facing the left-right direction. A long hole extending in the front-back direction is formed in the back side extension portion 63. The back side extension portion 63 is formed so as to be adjacent to the cutout portion 62.

The front side extension portion 64 is a portion extending upward from the plate portion 61 on the front side of the cutout portion 62. The front side extension portion 64 is disposed with its plate surface facing an oblique direction (a direction inclined to the left and right with respect to the front-back direction). The front side extension portion 64 is formed so as to be adjacent to the cutout portion 62.

Figure 18:
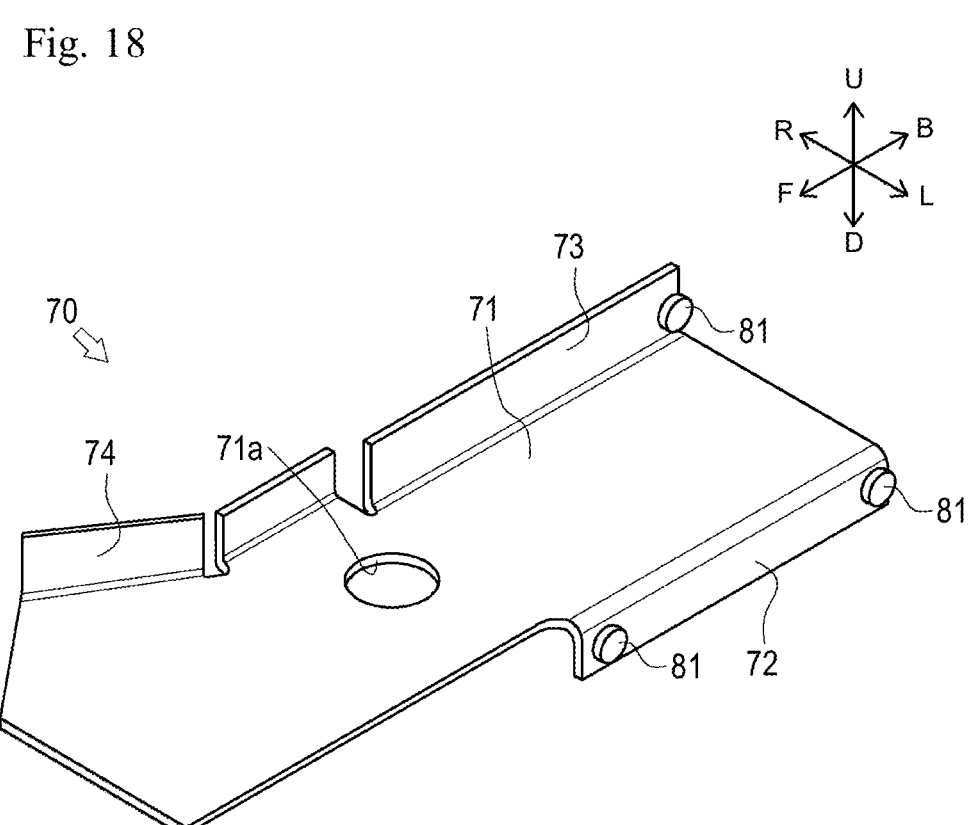
FIG. 18 is a perspective view illustrating the movable member.

The movable member 70 is a relatively movable member with respect to the plate-shaped member 60. As illustrated in FIG. 18, the movable member 70 includes a plate portion 71, a first extension portion 72, a second extension portion 73, and a third extension portion 74.

The plate portion 71 is a portion disposed with its plate surface facing up and down. The movable member 70 is formed by partially bending an end portion of the plate portion 71. An insertion hole 71a is formed in the plate portion 71. The insertion hole 71a is formed so as to vertically penetrate a middle portion in the front-back direction of the plate portion 71. The insertion hole 71a is formed in a substantially circular shape in plan view. The cables 40 and 50 are inserted into the insertion hole 71a (see FIG. 16).

The first extension portion 72 is a portion extending downward from a left rear portion of the plate portion 71.

The first extension portion 72 is disposed with its plate surface oriented in the left-right direction. The second extension portion 73 is a portion extending upward from a right rear portion of the plate portion 71. The second extension portion 73 is disposed with its plate surface facing the left-right direction. The first extension portion 72 and the second extension portion 73 are formed behind the insertion hole 71a. The third extension portion 74 is a portion extending upward from a right front portion of the plate portion 71. The third extension portion 74 is disposed with its plate surface oriented in the same direction as the front side extension portion 64 (see FIG. 16) of the plate-shaped member 60. The third extension portion 74 is formed in front of the insertion hole 71a.

Figure 17:
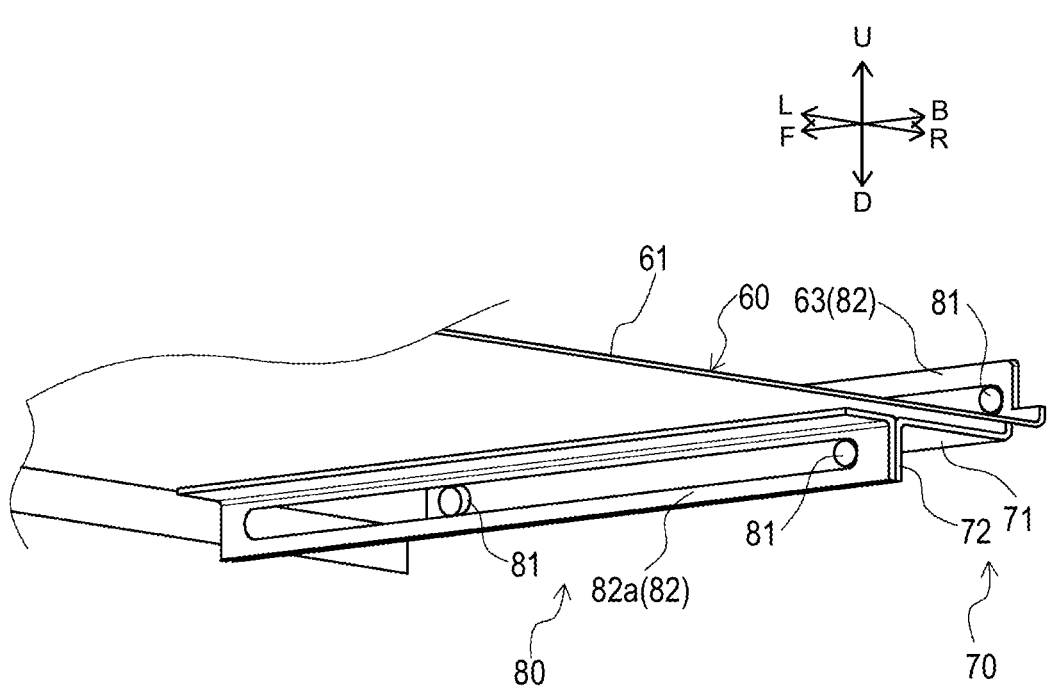
FIG. 17 is an enlarged perspective view illustrating a guide mechanism.

The guide mechanism 80 illustrated in FIGS. 16 and 17 is for guiding the movement of the movable member 70. The guide mechanism 80 includes a roller 81 and a guide portion 82.

The roller 81 is rotatably provided on the movable member 70. As illustrated in FIG. 18, the rollers 81 are provided on the left side surfaces of the second extension portion 73 and the first extension portion 72. The rollers 81 are provided at a rear end portion of the second extension portion 73 and a front end portion and a rear end portion of the first extension portion 72. Hereinafter, the roller 81 provided in the second extension portion 73 is referred to as an "upper roller 81", and the roller 81 provided in the first extension portion 72 is referred to as a "lower roller 81".

The guide portion 82 illustrated in FIGS. 16 and 17 guides the upper and lower rollers 81. The guide portion 82 that guides the upper roller 81 is configured by the back side extension portion 63 of the plate-shaped member 60. The guide portion 82 that guides the lower roller 81 is configured by a substantially L-shaped attachment member 82a fixed to the lower surface of the plate-shaped member 60. The attachment member 82a includes a long hole extending back and forth.

The upper roller 81 is fitted to the guide portion 82 on an upper side. The lower roller 81 is fitted to the guide portion 82 on a lower side. As a result, the guide mechanism 80 (the roller 81 and the guide portion 82) is provided above and below the plate portion 61 of the plate-shaped member 60 with the plate portion 61 interposed therebetween. Furthermore, the movable member 70 is provided on the vehicle body through the guide mechanism 80 and the plate-shaped member 60, and can relatively move forward and backward with respect to the plate-shaped member 60 by the rotation of the roller 81. Note that FIGS. 16 and 17 illustrate the movable member 70 that has moved backmost.

Furthermore, as illustrated in FIG. 16, the plate portion 71 of the movable member 70 is provided so as to close the cutout portion 62 of the plate-shaped member 60. Thus, it is possible to prevent dust from flowing into and out of the boarding portion 8a through the cutout portion 62. Furthermore, it is possible to prevent the lower side of the boarding portion 8a from being viewed through the cutout portion 62 and to improve the aesthetic appearance.

Furthermore, the insertion hole 71a is disposed inside the cutout portion 62. In the present embodiment, front-back widths of the upper and lower guide portions 82 (long holes) are substantially the same as a front-back width of the cutout portion 62. Thus, in the present embodiment, the movable member 70 is provided so that the insertion hole 71a moves back and forth within the range of the cutout portion 62.

Hereinafter, a state in which the movable member 70 moves will be described by exemplifying a case where the seat 16 moves forward.

When the seat 16 illustrated in FIG. 15 is moved forward, the loader lever 20 and the operation mechanism 30 are moved forward. The cables 40 and 50 illustrated in FIG. 16 are moved forward by the movement of the loader lever 20 and the like. At this time, the cables 40 and 50 press the movable member 70 forward through the insertion hole 71a.

Figure 19:
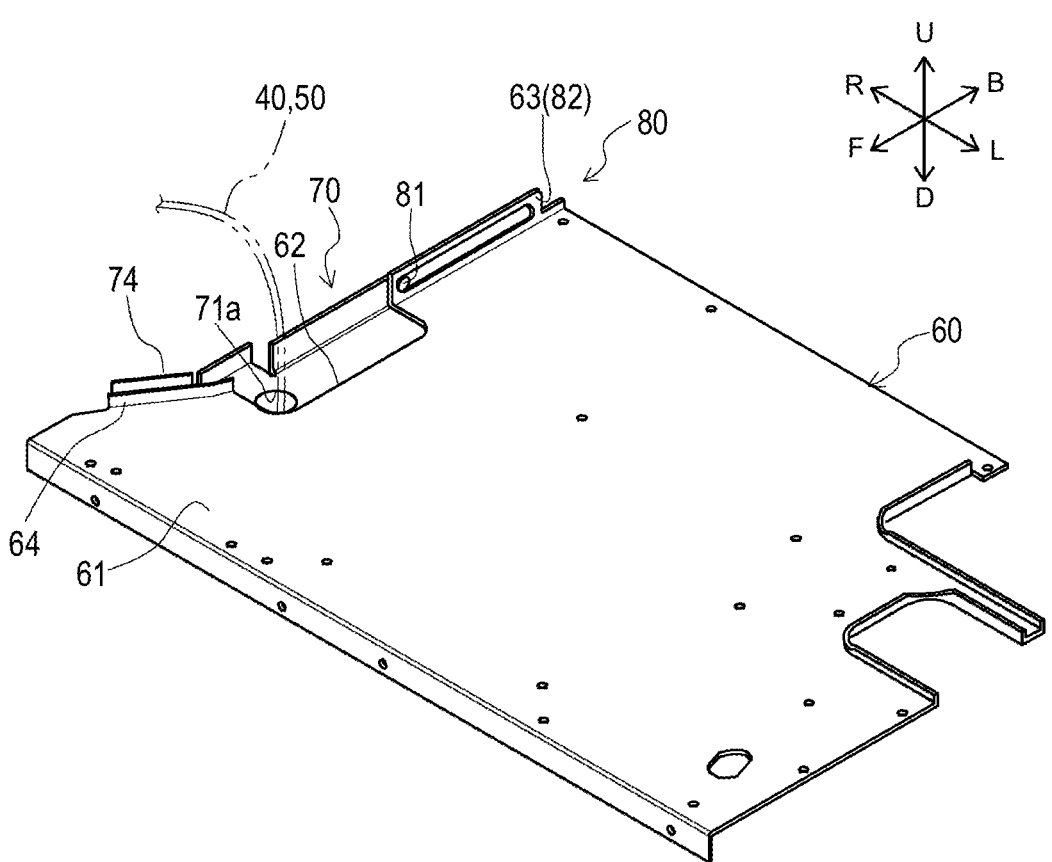
FIG. 19 is a perspective view illustrating the movable member moved forward.
Figure 20:
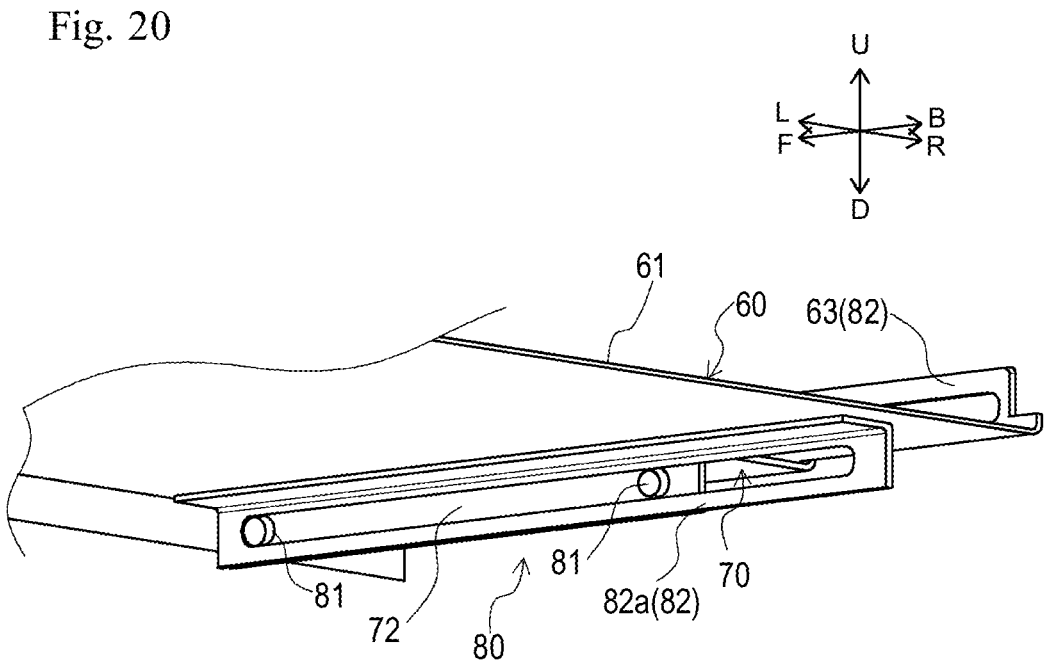
FIG. 20 is an enlarged perspective view illustrating the guide mechanism that guides the movable member forward.

The roller 81 rotates the guide portion 82 forward by the forward pressing of the insertion hole 71a by the cables 40 and 50, and the movable member 70 is moved forward with respect to the plate-shaped member 60 as illustrated in FIGS. 19 and 20. As a result, since the insertion portion (the insertion hole 71a) of the cables 40 and 50 can be moved forward so as to follow the forward movement of the seat 16, the cables 40 and 50 can be suppressed from being forcibly deformed in the insertion portion, and an increase in sliding resistance of the cables 40 and 50 can be suppressed.

Furthermore, since the insertion portion (insertion hole 71a) of the cables 40 and 50 moves so as to follow the cables 40 and 50, the size of the insertion hole 71a can be suppressed to the minimum size through which the cables 40 and 50 can be inserted. Therefore, it is possible to prevent the distribution of dust through the insertion hole 71a and improve the aesthetic appearance. Furthermore, by providing a protective member such as a grommet in the insertion hole 71a or providing a protective member only in a portion inserted into the insertion hole 71a of the cable 40 and 50, it is possible to easily prevent the cable 40 and 50 from being damaged by the edge of the insertion hole 71a.

Moreover, the plate portion 71 of the movable member 70 is formed so as to always close the cutout portion 62 regardless of the front-back position (see FIGS. 16 and 19). Accordingly, it is possible to effectively prevent the distribution of dust and improve the aesthetic appearance.

Furthermore, in the present embodiment, by providing the two upper and lower guide mechanisms 80, rattling of the movable member 70 can be suppressed, and the movable member 70 can be suitably moved. In particular, in the present embodiment, a plurality of (two) lower rollers 81 are configured to rotate with respect to one lower guide portion 82 (see FIG. 17). Thus, the load applied to the lower roller 81 can be dispersed.

Furthermore, as illustrated in FIG. 15, the cables 40 and 50 extend backward (in a movement direction of the seat 16) from the loader lever 20 and the operation mechanism 30, and the middle portion is guided to the lower side of the bottom portion 8b of the boarding portion 8a through the movable member 70 (insertion hole 71a). In the present embodiment, since the loader lever 20 and the operation mechanism 30 are disposed in front of the armrest 17, the distance between the loader lever 20 and the like and the movable member 70 along the front-back direction can be made relatively long. As a result, it is possible to prevent the cables 40 and 50 from being rapidly bent downward. Furthermore, by aligning the movement direction (front-back direction) of the seat 16 and the direction (front-back direction) in which the cables 40 and 50 extend from the loader lever 20, even in a case where the cables 40 and 50 move back and forth together with the seat 16, it is possible to suppress a change in the bending radius of the bent portions of the cables 40 and 50.

As described above, the operation mechanism 30 according to the present embodiment includes the first rocking member 32 rockable about the lower first rocking shaft 32b (first rocking shaft), the second rocking member 37 rockable about the lower second rocking shaft 38 (second rocking shaft) disposed in a direction perpendicular to the lower first rocking shaft 32b, the rod end 36 (first coupling member)

fixed to the first rocking member 32, the coupling rod 39 (second coupling member) fixed to the second rocking member 37 and including the shaft-shaped portion 39b disposed such that the axis D38 is inclined with respect to the lower second rocking shaft 38, the shaft-shaped portion 39b being slidably coupled to the rod end 36, and the loader lever 20 (operation tool) coupled to one of the first rocking member 32 or the second rocking member 37.

With this configuration, when the operation of the loader lever 20 is transmitted, the direction of rocking can be converted with a simple configuration.

Furthermore, the lower first rocking shaft 32b is disposed to extend along the front-back direction of the vehicle body, and the lower second rocking shaft 38 is disposed to extend along the left-right direction of the vehicle body.

With this configuration, when the operation of the loader lever 20 is transmitted, the direction of rocking can be converted with a simple configuration.

Furthermore, the cable support portion 31f (support portion) that supports the first cable 40 and the second cable 50 (cables) that transmit the operation of the loader lever 20 so as to extend along the front-back direction of the vehicle body is further included.

With such a configuration, the cables can be disposed so as to extend in the front-back direction of the vehicle body, and for example, the cables can be disposed while avoiding interference between a lower member or the like of the operation mechanism 30 and the cables.

Furthermore, the lower first rocking shaft 32b and the lower second rocking shaft 38 are disposed at the same position in a direction (vertical direction) orthogonal to the lower first rocking shaft 32b and the lower second rocking shaft 38 (see FIG. 5).

With this configuration, the operation mechanism 30 can be configured compactly.

Furthermore, the support member 31 that supports the first rocking member 32 through the lower first rocking shaft 32b and supports the second rocking member 37 through the lower second rocking shaft 38 is further included.

With such a configuration, the first rocking member 32 and the second rocking member 37 can be integrated (unitized) with the support member 31. This makes it possible to facilitate management of components and attachment work.

Furthermore, the support member 31 is formed with the cable support portion 31f (support portion) that is coupled to the other of the first rocking member 32 or the second rocking member 37 and supports the second cable 50 (cable) that transmits the operation of the loader lever 20.

With this configuration, the second cable 50 can be disposed using the support member 31.

Furthermore, the restriction member 35 that is provided on the support member 31 and restricts rocking of at least one of the first rocking member 32 or the second rocking member 37 at a predetermined position is further included.

With such a configuration, the rocking operation of the loader lever 20 can be appropriately restricted, and operability can be improved.

Furthermore, the tractor 1 (working vehicle) according to the present embodiment includes the seat 16 capable of adjusting a position, and the operation mechanism 30, in which the operation mechanism 30 is configured to move integrally with the seat 16 (see FIG. 15).

With this configuration, a relative positional relationship between the seat 16 and the operation mechanism 30 can be maintained, and the operability of the operation mechanism 30 can be prevented from deteriorating.

Furthermore, the seat 16 is capable of adjusting a position in a front-back direction of a vehicle body, the operation mechanism 30 is disposed in front of the armrest 17 provided on the seat 16, the second cable 50 (cable) that transmits the operation of the loader lever 20 is coupled to the operation mechanism 30, and the second cable 50 is provided so as to extend backward from the operation mechanism 30 and is disposed so as to bend forward in a middle portion.

With this configuration, it is possible to suppress a large change in a bending radius of the bent second cable 50 with the movement of the seat 16, and it is possible to suppress an increase in the sliding resistance of the second cable 50.

Furthermore, the armrest 17 whose relative position with respect to the operation mechanism 30 is adjustable is further included.

With this configuration, the operability of the operation mechanism 30 can be improved.

Note that the lower first rocking shaft 32b according to the present embodiment is an embodiment of the first rocking shaft.

Furthermore, the lower second rocking shaft 38 according to the present embodiment is an embodiment of the second rocking shaft.

Furthermore, the rod end 36 according to the present embodiment is an embodiment of the first coupling member.

Furthermore, the coupling rod 39 according to the present embodiment is an embodiment of the second coupling member.

Furthermore, the loader lever 20 according to the present embodiment is an embodiment of the operation tool.

Furthermore, the tractor 1 according to the present embodiment is an embodiment of the working vehicle.

Furthermore, as described above, the tractor 1 (working vehicle) according to the present embodiment includes: the loader lever 20 (moving member) that is movable; the cables 40 and 50 (longitudinal members) that are formed in a flexible longitudinal shape, are coupled to the loader lever 20, and move with the movement of the loader lever 20; and the movable member 70 that includes the insertion hole 71a (insertion portion) through which the cables 40 and 50 are inserted, and that is provided to be relatively movable with respect to a vehicle body.

With this configuration, the longitudinal members (cables 40 and 50) can be suitably guided.

That is, in a case where it is necessary to dispose the cables 40 and 50 so as to penetrate members, the members (movable member 70) are configured to be movable, and the movable member 70 is moved following the cables 40 and 50, so that it is possible to suppress the cables 40 and 50 from being forcibly deformed. Furthermore, since the movable member 70 can be moved following the cables 40 and 50, the insertion hole 71a can be kept to a minimum size, and distribution of dust through the insertion hole 71a and deterioration of aesthetic appearance can be prevented.

Furthermore, the plate-shaped member 60 (fixing member) fixed to the vehicle body and including the cutout portion 62 is further included, and the movable member 70 is provided to be relatively movable with respect to the plate-shaped member 60 such that the insertion hole 71a moves within a range inside the cutout portion 62.

With such a configuration, it is possible to suppress excessive deformation of the cables 40 and 50 disposed so as to penetrate the plate-shaped member 60.

Furthermore, the plate-shaped member 60 includes the plate portion 61 (first plate-shaped portion) in which the cutout portion 62 is formed, and the movable member 70 includes the plate portion 71 (second plate-shaped portion) in which the insertion hole 71*a* is formed and that is formed to close the cutout portion 62 of the plate portion 61 (see FIG. 16).

With such a configuration, it is possible to prevent the distribution of dust and improve the aesthetic appearance.

Furthermore, the guide mechanism 80 that guides the movement of the movable member 70 is further included.

With such a configuration, the movable member 70 can be suitably moved.

Furthermore, the guide mechanism 80 includes the roller 81 rotatably provided on one of the movable member 70 or the plate-shaped member 60, and the guide portion 82 provided on the other of the movable member 70 or the plate-shaped member 60 and that guides the roller 81. With such a configuration, the movable member 70 can be suitably moved.

Furthermore, the guide mechanism 80 is provided on each of one side surface side and the other side surface side (upper side and lower side) of the plate portion 61 (see FIGS. 16 and 17).

With such a configuration, the movable member 70 can be suitably moved.

Furthermore, the moving member includes the loader lever 20 (operation tool) that operates the front loader 10, and the longitudinal members include the cables 40 and 50 that transmit the operation of the loader lever 20.

With this configuration, it is possible to suppress excessive deformation of the cables 40 and 50 coupled to the loader lever 20 that operates the front loader 10.

Furthermore, the seat 16 provided on the boarding portion 8*a* on which a worker boards, the seat being adjustable in position, is further included, and the plate-shaped member 60 forms a bottom portion 8*b* of the boarding portion 8*a*, and the loader lever 20 is configured to move integrally with the seat 16 (see FIG. 15).

With such a configuration, it is possible to suppress the excessive deformation of the cables 40 and 50 that move with the position adjustment of the seat 16.

Furthermore, the cables 40 and 50 are provided so as to extend from the loader lever 20 in one direction (backward) along a movement direction of the seat 16, are guided below the bottom portion 8*b* through the insertion hole 71*a*, and extend in a direction (forward) opposite to the one direction below the bottom portion 8*b*.

With this configuration, it is possible to suppress an increase in sliding resistance of the cables 40 and 50 due to the movement of the seat 16.

Note that the tractor 1 according to the present embodiment is an embodiment of the working vehicle.

Furthermore, the loader lever 20 according to the present embodiment is an embodiment of the moving member and the operation tool. Furthermore, the insertion hole 71*a* according to the present embodiment is an embodiment of the insertion portion.

Furthermore, the plate-shaped member 60 according to the present embodiment is an embodiment of the fixing member.

Furthermore, the plate portion 61 according to the present embodiment is an embodiment of the first plate-shaped portion.

Furthermore, the plate portion 71 according to the present embodiment is an embodiment of the second plate-shaped portion.

Although the embodiment of the present invention has been described above, the present invention is not limited to the above configurations, and various modifications can be made within the scope of the invention described in the claims.

For example, the working vehicle according to the present embodiment is the tractor 1, but the type of the working vehicle is not limited thereto. The working vehicle may be another agricultural vehicle, a construction vehicle, an industrial vehicle, or the like.

Furthermore, in the present embodiment, as illustrated in FIG. 4, an example in which the rod end 36 is provided in the first rocking member 32 that rocks integrally with the loader lever 20, and the coupling rod 39 is provided in the second rocking member 37 to which the second cable 50 is coupled has been described, but the present invention is not limited thereto. For example, it is also possible to provide the coupling rod 39 on the first rocking member 32 and provide the rod end 36 on the second rocking member 37.

Furthermore, as illustrated in FIG. 5, the lower first rocking shaft 32*b* and the lower second rocking shaft 38 are disposed at the same height, but the present invention is not limited thereto. The lower first rocking shaft 32*b* and the lower second rocking shaft 38 may be disposed at different height positions.

Furthermore, although the first rocking member 32, the second rocking member 37, and the like of the operation mechanism 30 are integrated with the support member 31 illustrated in FIG. 5, the present invention is not limited thereto, and some members may be supported (fixed) by members different from the support member 31.

Furthermore, although the restriction member 35 illustrated in FIG. 5 restricts the rocking of the first rocking member 32 to the left and right, it is also possible to provide a restriction member that restricts the rocking of the first rocking member 32 to the front and back.

Furthermore, although the restriction member 35 illustrated in FIG. 5 restricts the rocking of the first rocking member 32, for example, it is also possible to provide a restriction member that restricts the rocking of the second rocking member 37.

Furthermore, the loader lever 20 and the operation mechanism 30 move integrally with the seat 16 as illustrated in FIG. 15, but the present invention is not limited thereto, and the seat 16 may move relative to the loader lever 20 and the operation mechanism 30.

Furthermore, although the armrest 17 moves relative to the loader lever 20 and the operation mechanism 30, the present invention is not limited thereto, and the loader lever 20 and the operation mechanism 30 may move integrally with the movement of the armrest 17. Furthermore, although the loader lever 20 and the operation mechanism 30 are disposed in front of the armrest 17, a positional relationship among the armrest 17, the loader lever 20, and the operation mechanism 30 is not limited thereto.

Furthermore, the cables 40 and 50 extend backward from the loader lever 20 and the operation mechanism 30, but the extending direction of the cables 40 and 50 from the loader lever 20 and the like is not particularly limited. For example, the cables 40 and 50 may extend downward from the loader lever 20 or the like. Furthermore, although the cables 40 and 50 are disposed so as to be partially bent, the present invention is not limited thereto, and the cables may be disposed substantially linearly (so as not to be bent).

Furthermore, in the present embodiment, as illustrated in FIG. 16, an example in which the cutout portion 62 is formed in the plate-shaped member 60 and the movable member 70 is provided in the cutout portion 62 is illustrated, but the present invention is not limited thereto. For example, it is also possible to provide the movable member 70 outside the plate-shaped member 60 without forming the cutout portion 62 in the plate-shaped member 60.

Furthermore, although the plate-shaped member 60 and the movable member 70 are formed by appropriately bending the end portions of the plate portions 61 and 71, the shapes, structures, and the like of the plate-shaped member 60 and the movable member 70 are not limited to the present embodiment, and can be arbitrarily changed.

Furthermore, in the present embodiment, the roller 81 is provided on the movable member 70 and the guide portion 82 is provided on the plate-shaped member 60, but the configuration of the guide mechanism 80 is not limited thereto. For example, the roller 81 may be provided on the plate-shaped member 60, and the guide portion 82 may be provided on the movable member 70.

Furthermore, although the guide mechanism 80 includes the roller 81 and the guide portion 82, the members constituting the guide mechanism 80 are not limited to the roller 81 and the guide portion 82, and can be arbitrarily changed. For example, a slidable rail or the like can be used as the guide mechanism 80.

Furthermore, in the present embodiment, as illustrated in FIGS. 15, 16, and the like, the cables 40 and 50 are exemplified as the longitudinal member guided through the movable member 70, but the present invention is not limited thereto. For example, a wire harness for transmitting electric power and electric signals, a duct for guiding air for air conditioning, an air conditioner hose used for an air conditioner, and the like can be guided by the movable member 70 as a longitudinal member. For example, in a case where a seat air conditioner that is provided on the seat 16 to heat or cool the seat 16 is provided, a duct, an air conditioner hose, and the like connected to the seat air conditioner can be guided through the movable member 70.

Furthermore, in the present embodiment, the loader lever 20 is exemplified as an example of the moving member to which the longitudinal member is coupled, but the present invention is not limited thereto, and can be applied to various other moving members.

INDUSTRIAL APPLICABILITY

The present invention can be applied to a working vehicle.

REFERENCE SIGNS LIST

1: Tractor
20: Loader lever
30: Operation mechanism
32: First rocking member
32*b*: Lower first rocking shaft
36: Rod end
37: Second rocking member
39: Coupling rod
39*b*: Shaft-shaped portion
40: First cable
50: Second cable
70: Movable member
71*a*: Insertion hole

The invention claimed is:

1. A working vehicle comprising:
   a moving member that is movable;
   a longitudinal member that is formed in a flexible longitudinal shape, is coupled to the moving member, and moves with movement of the moving member; and a laterally movable member that includes an insertion portion through which the longitudinal member is inserted, and that is provided to be relatively movable horizontally with respect to a vehicle body in response to at least pressure applied by movement of the longitudinal member against the insertion portion.

2. The working vehicle according to claim 1, further comprising a fixing member fixed to the vehicle body and including a cutout portion,
   wherein the laterally movable member is provided to be relatively movable with respect to the fixing member such that the insertion portion moves within a range inside the cutout portion.

3. The working vehicle according to claim 2, wherein
   the fixing member includes a first plate-shaped portion in which the cutout portion is formed, and
   the laterally movable member includes a second plate-shaped portion in which the insertion portion is formed and that is formed to close the cutout portion of the first plate-shaped portion.

4. The working vehicle according to claim 3, further comprising a guide mechanism that guides movement of the movable member.

5. The working vehicle according to claim 4, wherein
   the guide mechanism includes:
   a roller rotatably provided on one of the movable member or the fixing member; and
   a guide portion provided on another of the movable member or the fixing member and that guides the roller.

6. The working vehicle according to claim 4, wherein the guide mechanism is provided on each of one side surface side and another side surface side of the first plate-shaped portion.

7. The working vehicle according to claim 2, wherein
   the moving member includes an operation tool that operates a front loader, and
   the longitudinal member includes a cable that transmits an operation of the operation tool.

8. The working vehicle according to claim 7, further comprising a seat provided on a boarding portion on which a worker boards, the seat being adjustable in position,
   wherein the fixing member forms a bottom portion of the boarding portion, and
   the operation tool is configured to move integrally with the seat.

9. The working vehicle according to claim 8, wherein the longitudinal member is provided so as to extend from the operation tool in one direction along a movement direction of the seat, and is guided below the bottom portion through the insertion portion and extends in a direction opposite to the one direction below the bottom portion.

10. The working vehicle according to claim 3, wherein
    the moving member includes an operation tool that operates a front loader, and
    the longitudinal member includes a cable that transmits an operation of the operation tool.

11. The working vehicle according to claim 4, wherein
    the moving member includes an operation tool that operates a front loader, and
    the longitudinal member includes a cable that transmits an operation of the operation tool.

12. The working vehicle according to claim 5, wherein
    the moving member includes an operation tool that operates a front loader, and
    the longitudinal member includes a cable that transmits an operation of the operation tool.

13. The working vehicle according to claim 6, wherein the moving member includes an operation tool that operates a front loader, and the longitudinal member includes a cable that transmits an operation of the operation tool.

14. The working vehicle of claim 1, further comprising:

a fixing member fixed to a vehicle body of the working vehicle and including a cutout portion overlapping a lateral range of motion of the insertion portion, the fixing member having a first vertical flange with a first horizontal slot; and the laterally moveable member having a second vertical flange with a first roller mounted in the first horizontal slot of the first vertical flange, wherein horizontal movement of the laterally movable member moves the first roller horizontally along the first horizontal slot.

15. The working vehicle of claim 14, further comprising:

the first vertical flange extends above the fixing member;

a third vertical flange extending below the fixing member, the third vertical flange having a second horizontal slot; and the laterally moveable member having a fourth vertical flange with a second roller mounted in the second horizontal slot of the second vertical flange, wherein horizontal movement of the laterally moving member moves the second roller horizontally along the second horizontal slot.

\*    \*    \*    \*    \*